United States Patent
Wu et al.

(10) Patent No.: US 9,270,223 B2
(45) Date of Patent: Feb. 23, 2016

(54) METHODS OF DETERMINING MACHINE TERMINAL VOLTAGE AND SYSTEMS THEREOF

(71) Applicants: Long Wu, Fargo, ND (US); Anthony Weber, Moline, IL (US); Lav Thyagarajan, West Fargo, ND (US)

(72) Inventors: Long Wu, Fargo, ND (US); Anthony Weber, Moline, IL (US); Lav Thyagarajan, West Fargo, ND (US)

(73) Assignee: DEERE & COMPANY, Moline, IL (US)

(*) Notice: Subject to any disclaimer, the term of this patent is extended or adjusted under 35 U.S.C. 154(b) by 306 days.

(21) Appl. No.: 14/141,631

(22) Filed: Dec. 27, 2013

(65) Prior Publication Data

US 2014/0306638 A1 Oct. 16, 2014

Related U.S. Application Data

(63) Continuation-in-part of application No. 13/861,672, filed on Apr. 12, 2013, now Pat. No. 9,071,186.

(51) Int. Cl.
*G05B 11/28* (2006.01)
*H02P 27/08* (2006.01)
*H02P 21/00* (2006.01)
*H02P 21/14* (2006.01)

(52) U.S. Cl.
CPC ............ *H02P 27/08* (2013.01); *H02P 21/0035* (2013.01); *H02P 21/148* (2013.01); *H02P 2207/05* (2013.01)

(58) Field of Classification Search
CPC ..... H02P 27/08; H02P 6/085; H02M 7/53873
USPC ................. 318/599, 811, 400.01, 801, 727
See application file for complete search history.

(56) References Cited

U.S. PATENT DOCUMENTS

| 4,868,481 | A | | 9/1989 | Owen | |
|---|---|---|---|---|---|
| 5,321,598 | A | | 6/1994 | Moran | |
| 5,550,450 | A | * | 8/1996 | Palko et al. | 318/800 |
| 5,552,980 | A | | 9/1996 | Garces et al. | |
| 5,559,419 | A | * | 9/1996 | Jansen et al. | 318/808 |
| 5,977,660 | A | | 11/1999 | Mandalakas et al. | |
| 5,977,741 | A | * | 11/1999 | DeLange et al. | 318/801 |
| 7,190,143 | B2 | | 3/2007 | Wei et al. | |
| 7,342,378 | B2 | * | 3/2008 | Sakamoto et al. | 318/717 |
| 7,446,511 | B2 | | 11/2008 | Wu et al. | |
| 7,482,777 | B2 | * | 1/2009 | Tomigashi | 318/807 |
| 7,834,480 | B2 | | 11/2010 | Mandalakas et al. | |
| 2009/0322264 | A1 | | 12/2009 | Imura | |

(Continued)

OTHER PUBLICATIONS

Notice of Allowance for U.S. Appl. No. 13/861,672 dated Mar. 30, 2015.

(Continued)

*Primary Examiner* — Rina Duda
(74) *Attorney, Agent, or Firm* — Harness, Dickey & Pierce, P.L.C.

(57) ABSTRACT

At least one example embodiment discloses a control device for controlling an alternating current (ac) machine. The control device includes a processor configured to select a modulation mode from a plurality of modulation modes, determine a plurality of present phase voltages corresponding to phases of an inverter based on the selected modulation mode, the determination compensating for deadtimes associated with the selected modulation mode and phases of the inverter, the inverter configured to drive the ac machine and determine an estimated terminal voltage based on the plurality of present phase voltages.

21 Claims, 16 Drawing Sheets

(56) References Cited

U.S. PATENT DOCUMENTS

| | | |
|---|---|---|
| 2011/0031920 A1 | 2/2011 | Henderson et al. |
| 2012/0217915 A1 | 8/2012 | Wu et al. |
| 2012/0217923 A1 | 8/2012 | Wu et al. |
| 2013/0063059 A1* | 3/2013 | Chi et al. ................ 318/400.13 |
| 2013/0088905 A1 | 4/2013 | Lee et al. |

OTHER PUBLICATIONS

International Search Report and Written Opinion dated Aug. 19, 2014.

* cited by examiner

METHODS OF DETERMINING MACHINE TERMINAL VOLTAGE AND SYSTEMS THEREOF

PRIORITY

This non-provisional application is a continuation-in-part under 35 U.S.C. §120 of U.S. application Ser. No. 13/861,672 filed Apr. 12, 2013; the entire contents of which are hereby incorporated by reference.

FIELD

Example embodiments are related to electric drive device systems and/or methods for controlling electric drive devices such as Interior Permanent Magnet (IPM) motors or machines.

BACKGROUND

Alternating current (ac) machines (e.g., IPM machines) are extensively used in loaders, combines or other heavy equipment machinery vehicle electric drive because they provide a higher efficiency than direct current (dc) machines. Of the ac machines, an Interior Permanent Magnet (IPM) machine has high drive efficiency and a wider constant power operating range. An IPM machine controller also called an inverter, controls operation of the IPM machine. The controller produces ac control signals which are applied to the terminals of the IPM machine.

In an IPM machine, extra high machine terminal voltage could detrimentally cause current regulation collapse, introduce additional harmonics in the inverter voltage output, cause degraded current regulation quality and associated side effects such as torque ripple, rotor magnet and stator winding heating, acoustic noise, etc. The extra high machine terminal voltage may depend on d/q-axis voltage commands, manufacturing and raw material tolerance such as permanent magnet, stator/rotor steel saturation characteristics can cause variance in the machine terminal voltage, accuracy of a position offset calibration, ambient and cooling temperatures, accuracy of the inverter onboard a current transducer (CT), etc.

Typically the controller controls the IPM machine based on a plurality of information. For example, an accurate estimation of the actual inverter or terminal voltage of the IPM machine, together with position information of the machine, may provide a better estimation of a torque output of the IPM machine, which in turn may complete the torque control loop.

SUMMARY

Some embodiments are directed to methods and apparatuses for controlling an AC machine such as an IPM machine through estimating the actual inverter or machine terminal voltage.

At least one example embodiment discloses a control device for controlling a machine. The control device includes a processor configured to select a modulation mode and determine a plurality of terminal phase voltages of the machine based on the selected modulation mode.

BRIEF DESCRIPTION OF THE DRAWINGS

Example embodiments will be more clearly understood from the following detailed description taken in conjunction with the accompanying drawings. FIGS. 1A-13 represent non-limiting, example embodiments as described herein.

FIGS. 1A-1B is a block diagram of a system for controlling an electrical motor, according to an example embodiment;

FIG. 2 is a block diagram of an electronic data processing system consistent with FIGS. 1A-1B, according to an example embodiment;

FIG. 3 illustrates an example embodiment of a machine terminal voltage estimation module, a torque estimation module and a torque compensation module, illustrated in FIG. 1A;

FIG. 4 illustrates an inverter circuit according to an example embodiment;

FIGS. 5A-B illustrate a pulse width modulation (PWM) cycle and a double control period according to an example embodiment;

FIG. 6 illustrates an example embodiment of the machine terminal voltage estimation module, a terminal voltage feedback module and a current adjustment module, as shown in FIG. 1A;

FIG. 7 illustrates a method carried out by the machine terminal voltage estimation module shown in FIG. 6, according to an example embodiment;

FIG. 8 illustrates adjustments to the d/q-axis current magnitudes and the corresponding angle according to an example embodiment;

FIG. 10 illustrates a slewing based torque compensation scheme according to an example embodiment;

FIG. 11 illustrates a PI based torque compensation scheme according to an example embodiment;

FIG. 12 illustrates a method of generating torque upper/lower limits for a torque command limiter, according to an example embodiment; and FIG. 13 illustrates a method of torque estimation and compensation according to an example embodiment.

DETAILED DESCRIPTION

Figure 1A:
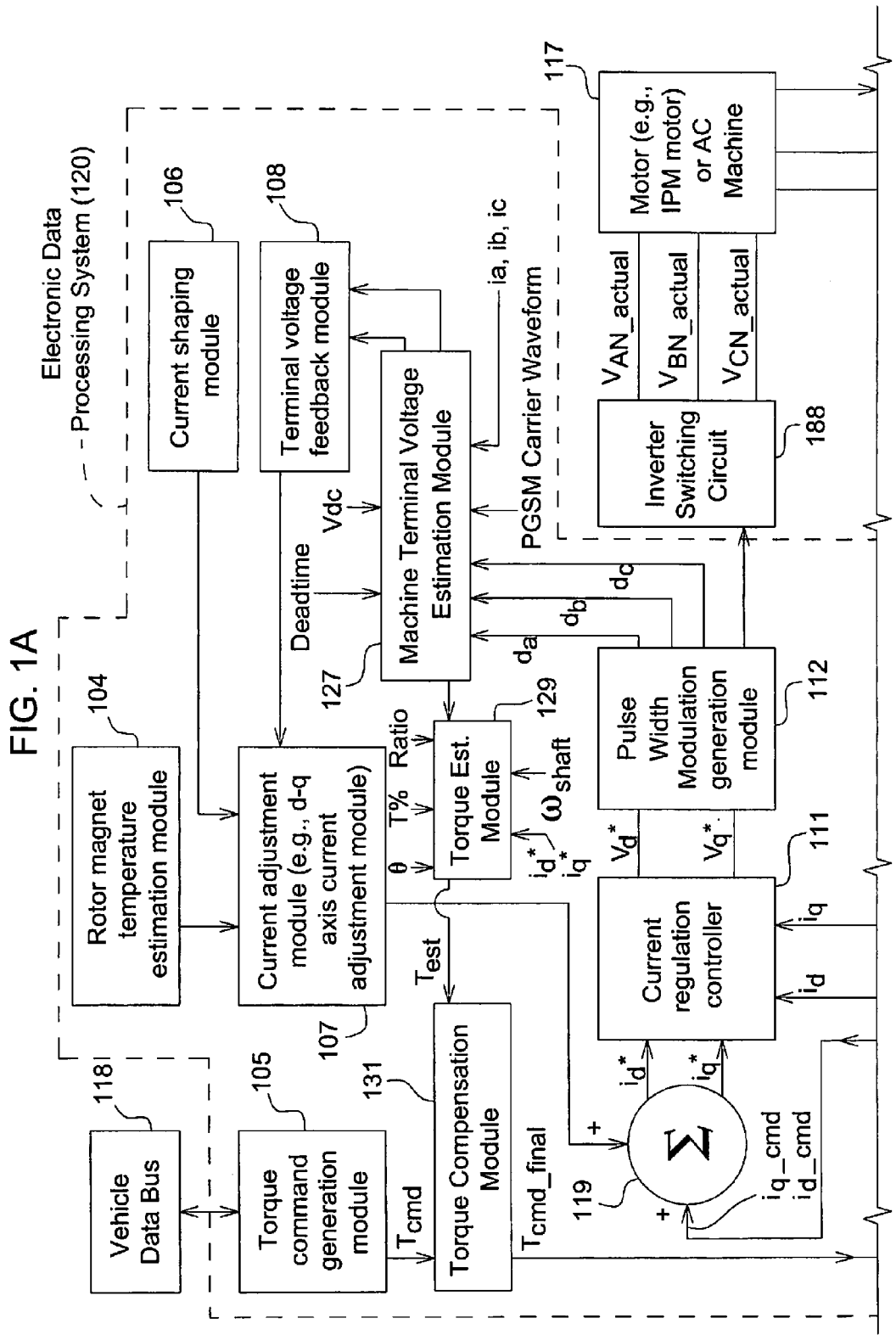

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

Figure 1B:
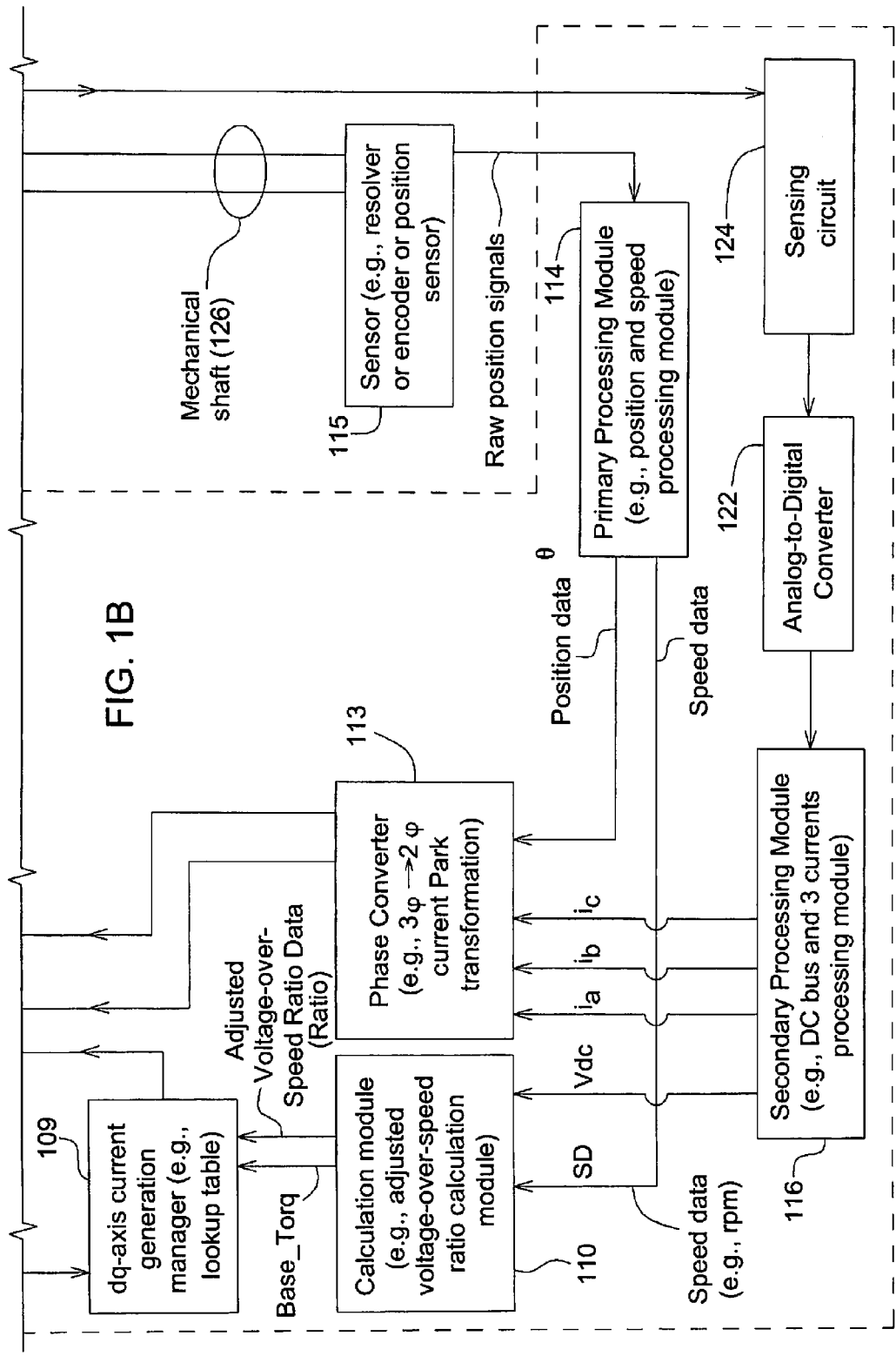

In accordance with an example embodiment, FIGS. 1A-1B illustrates a drive system 100 for controlling a machine such as an electric motor. The electrical motor may be a motor such as a motor 117 (e.g., an interior permanent magnet (IPM) motor) or another alternating current machine. The motor 117 has a nominal $d_c$ bus voltage (e.g., 320 Volts). The nominal voltage is a named voltage. For example, a nominal voltage of the motor 117 may be 320 Volts, but the motor may operate at a voltage above and below 320 Volts. In an example embodiment, the system, aside from the motor 117, may be referred to as an inverter or a motor controller. The system for controlling the motor 117 may also be referred to as a machine system.

It should be understood that the drive system 100 may include additional features that are not illustrated in FIG. 1A. The features shown in FIGS. 1A-1B are illustrated for the convenience of describing the drive system 100 and it should be understood that the drive system 100 should not be limited to the features shown in FIGS. 1A-1B.

The system 100 includes electronic modules, software modules, or both. In an example embodiment, the drive system 100 includes an electronic data processing system 120 to support storing, processing or execution of software instructions of one or more software modules. The electronic data processing system 120 is indicated by the dashed lines in FIGS. 1A-1B and is shown in greater detail in FIG. 2. The electronic data processing system 120 may also be referred to as a controller and/or processor for the motor 117. The data processing system 120 is configured to select a modulation mode, and determine a plurality of terminal phase voltages of the machine based on the selected modulation mode. Modulation mode may refer to PWM, square wave, triangular wave, or sine wave, or the frequency, duty cycle or dead time associated with any of the foregoing.

The data processing system 120 is coupled to an inverter circuit 188. The inverter circuit 188 may be a three-phase inverter. The inverter circuit 188 includes a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117.

In an example embodiment, a torque command generation module 105 is coupled to a torque compensation module, which is coupled to a d-q axis current generation manager 109 (e.g., d-q axis current generation look-up tables). The d-q axis current refers to the direct axis current and the quadrature axis current as applicable in the context of vector-controlled alternating current machines, such as the motor 117. The output of the d-q axis current generation manager 109 (d-q axis current commands iq_cmd and id_cmd) and the output of a current adjustment module 107 (e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111. While the term current command is used, it should be understood that current command refers to a target current value.

The current regulation controller 111 is capable of communicating with the pulse-width modulation (PWM) generation module 112 (e.g., space vector PWM generation module). The current regulation controller 111 receives respective final d-q axis current commands (e.g., id* and iq*) and actual d-q axis currents (e.g., id and iq) and outputs corresponding d-q axis voltage commands (e.g., Vd* and Vq* commands) for input to the PWM generation module 112.

In an example embodiment, the PWM generation module 112 provides pulse commands for control of the inverter circuit 188 and provides duty ratios $d_a$, $d_b$, $d_c$ for each phase (a, b and c) of the inverter circuit 188 to a terminal voltage estimation module 127. The processing system determines the three phase duty ratios $d_a$, $d_b$ and $d_c$. Then based on the duty ratios, deadtime, and PWM carrier waveform, the PWM pulses are created by the PWM generation module 112 and sent to the inverter circuit 188. The three phase duties $d_a$, $d_b$, $d_c$ are sent to the terminal voltage estimation module 127. Outputs of the PWM generation module 112 are coupled to an inverter circuit 188. The output stage of the inverter circuit 188 (e.g., output present phase voltages $V_{AN\_actual}$, $V_{BN\_actual}$ and $V_{CN\_actual}$) provides a pulse-width modulated voltage waveform or other voltage signal for control of the motor 117. The voltages $V_{AN}$, $V_{BN}$ and $V_{CN}$ may be referred to as phase voltages, current control step voltages or present control step voltages, for example. In an example embodiment, the inverter circuit 188 is powered by a direct current (dc) voltage bus.

The inverter circuit 188 includes a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

The motor 117 is associated with the sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In an example embodiment, the sensor 115 may be coupled to an analog-to-digital converter (not shown) that converts analog raw position data or velocity data to digital raw position or velocity data, respectively. In other example embodiments, the sensor 115 (e.g., digital position encoder) may provide a digital data output of raw position data or velocity data for the motor shaft 126 or rotor.

A first output (e.g., position data θ for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data SD for the motor 117) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., dc bus voltage and three phase current processing module). For example, the sensing circuit 124 is associated with the motor 117 for measuring three phase currents (e.g., current applied to the windings of the motor 117, back EMF (electromotive force) induced into the windings, or both).

Certain outputs of the primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and is from the secondary processing module 116 and position data θ from the sensor 115. The output of the phase converter 113 module (id, iq) is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide the speed data SD (e.g., motor shaft 126 speed in revolutions per minute), whereas the secondary processing module 116 may provide a measured (detected) level of the operating dc bus voltage Vdc of the motor 117 (e.g., on the dc bus of a vehicle). The dc voltage level on the dc bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the d-q axis current generation manager 109. The output of the calculation module 110 can adjust or impact the current commands iq_cmd and id_cmd generated by the d-q axis current generation manager 109 to compensate for fluctuation or variation in the dc bus voltage, among other things.

The rotor magnet temperature estimation module 104, the current shaping module 106, and the terminal voltage feedback module 108 are coupled to or are capable of communicating with the d-q axis current adjustment module 107. In turn, the d-q axis current adjustment module 107 may communicate with the d-q axis current generation manager or the summer 119.

The rotor magnet temperature estimation module 104 estimates or determines the temperature of the rotor permanent magnet or magnets. In an example embodiment, the rotor magnet temperature estimation module 104 may estimate the temperature of the rotor magnets from, one or more sensors located on the stator, in thermal communication with the stator, or secured to the housing of the motor 117.

In another example embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In an example embodiment, the system may operate in the following manner. The torque command generation module 105 receives an input control data message, such as a speed control data message, a voltage control data message, or a torque control data message, over a vehicle data bus 118. The torque command generation module 105 converts the received input control message into raw torque control command data $T_{cmd}$. The torque compensation module 131 then creates an adjusted torque component $T_{cmd\_adj}$ based on a difference (error) between the raw torque control command data $T_{cmd}$ and an estimated torque $T_{est}$. The output of the torque compensation module 131 is a final torque command $T_{cmd\_final}$ which is a summation of the raw torque control command data $T_{cmd}$ and the adjusted torque component $T_{cmd\_adj}$.

The d-q axis current generation manager 109 selects or determines the direct axis current command and the quadrature axis current command associated with respective final torque control command data $T_{cmd\_final}$, base torque command data Base_Torq and the adjusted voltage over-speed ratio. For example, the d-q axis current generation manager 109 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data SD for the motor shaft 126, where the primary processing module 114 may convert raw position data provided by the sensor 115 into speed data SD.

The current adjustment module 107 (e.g., d-q axis current adjustment module) provides current adjustment data to adjust the direct axis current command id_cmd and the quadrature axis current command iq_cmd based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: the preliminary adjustment, the secondary adjustment, and the third adjustment.

Based off of the three phase duties ratios $d_a$, $d_b$, $d_c$, the PWM carrier waveform generated by the PWM generation module 112, and phase currents $i_a$, $i_b$ and $i_c$, the machine terminal voltage estimation module 127 estimates the inverter present phase voltages $V_{AN}$, $V_{BN}$, and $V_{CN}$ of the actual inverter output voltages $V_{AN\_actual}$, $V_{BN\_actual}$ and $V_{CN\_actual}$. Then the estimated inverter output voltages $V_{AN}$, $V_{BN}$, and $V_{CN}$ are used by the machine terminal voltage estimation module 127 to calculate the estimated machine terminal voltage. Comparing the estimated terminal voltage with a terminal voltage limit will create an error sent to a PI controller to create and adjust d-axis current and eventually adjust q-axis current.

The torque estimation module 129 generates estimated torque data $T_{est}$ based on the inverter phase voltages $V_{AN}$, $V_{BN}$ and $V_{CN}$ generated by the machine terminal voltage estimation module 127 and final current commands $i_q^*$, $i_d^*$.

The torque compensation module 131 is configured to generate final torque control command data $T_{cmd\_final}$ based on the estimated torque data $T_{est}$ and raw torque command data $T_{cmd}$.

In an example embodiment, the motor 117 may include an interior permanent magnet (IPM) machine or a synchronous IPM machine (IPMSM).

The sensor 115 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 115 includes a position sensor, where raw position data and associated time data are processed to determine speed or velocity data for the motor shaft 126. In another configuration, the sensor 115 includes a speed sensor, or the combination of a speed sensor and an integrator to determine the position of the motor shaft.

In yet another configuration, the sensor 115 includes an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 includes an optical encoder with an optical source that transmits a signal toward a rotating object coupled to the motor shaft 126 and receives a reflected or diffracted signal at an optical detector, where the frequency of received signal pulses (e.g., square waves) may be proportional to a speed of the motor shaft 126. In an additional configuration, the sensor 115 includes a resolver with a first winding and a second winding, where the first winding is fed with an alternating current, where the voltage induced in the second winding varies with the frequency of rotation of the rotor.

Figure 2:
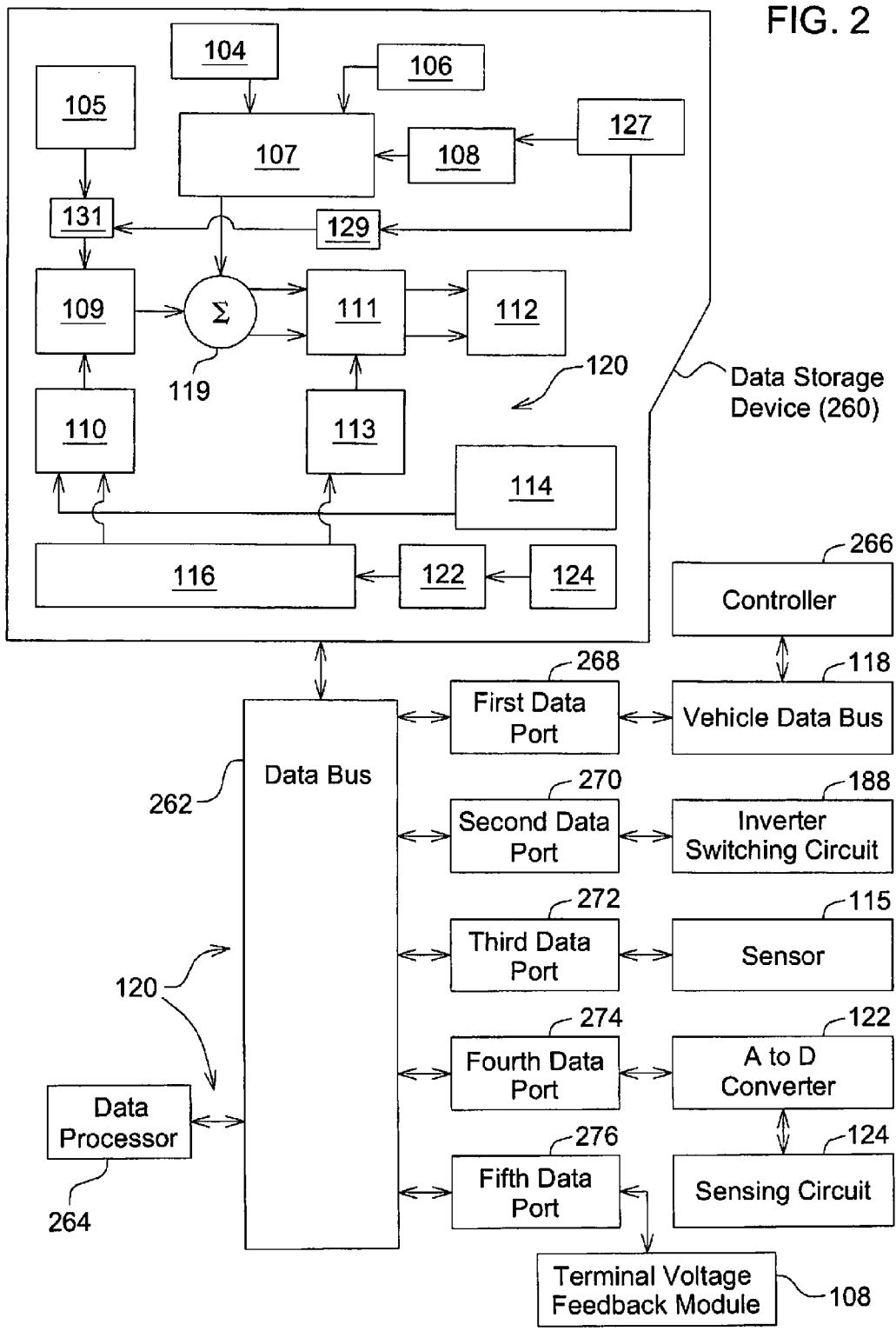

FIG. 2 is a block diagram of an electronic data processing system consistent with FIGS. 1A-1B, according to an example embodiment. In FIG. 2, the electronic data processing system 120 includes an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272, a fourth data port 274 and a fifth data port 276, although any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, the controller 266, or other control devices.

In some example embodiments, the sensor 115 and the primary processing module 114 may be associated with or supported by a third data port 272 of the data processing system 120.

The data processor 264 may be specifically programmed to execute the rotor magnet temperature estimation module 104, the torque command generation module 105, the current shaping module 106, the current adjustment module 107, the terminal voltage feedback module 108, the dq-axis current generation manager 109, the calculation module 110, the current regulation controller 111, the PWM generation module 112, the phase converter 113, the primary processing module 114, the secondary processing module 116, the summer 119, the ADC 122, the sensing circuit 124, the machine terminal voltage estimation module 127, the torque estimation module 129 and the torque compensation module 131.

Figure 3:
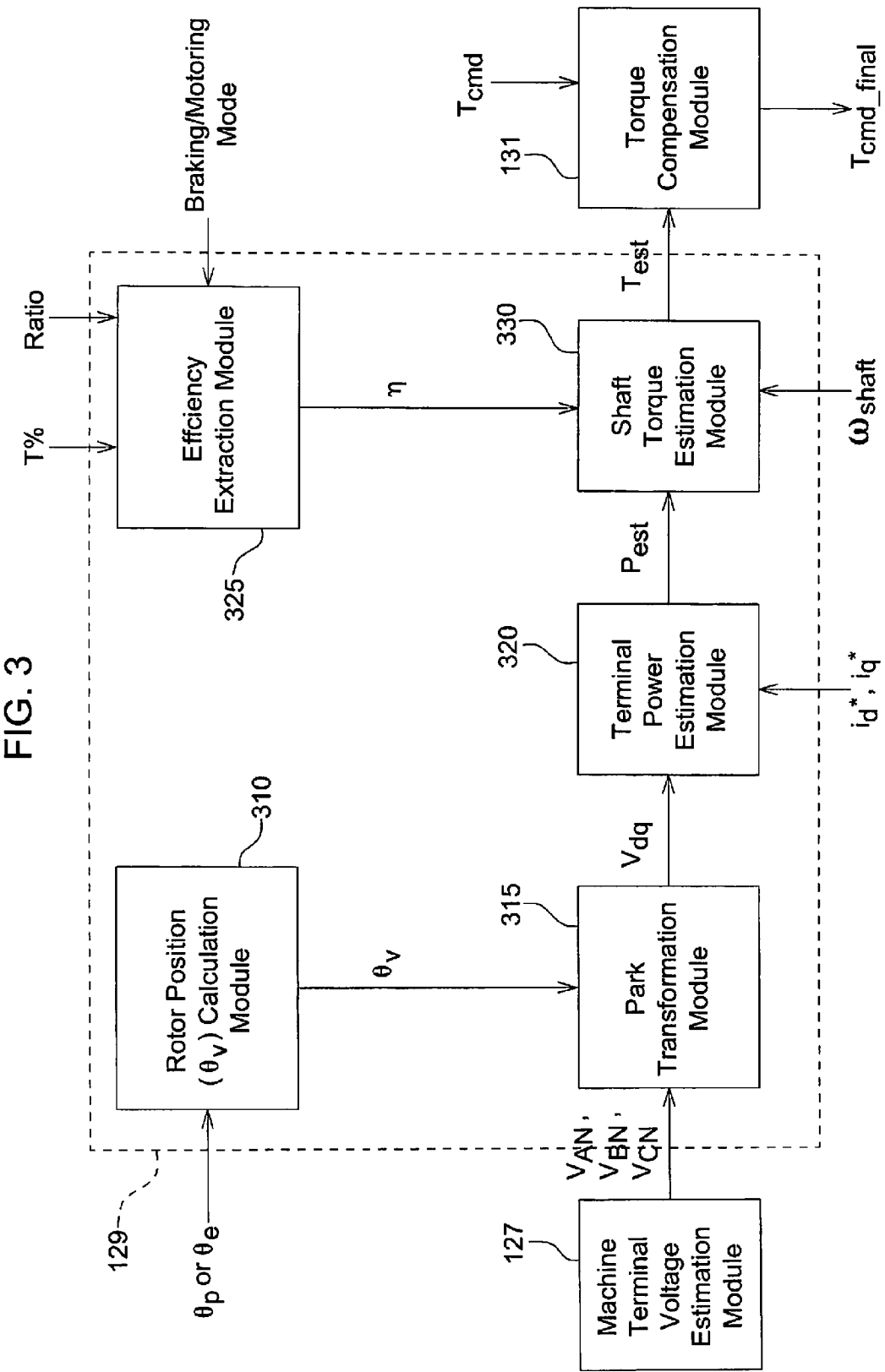

FIG. 3 illustrates an example embodiment of the machine terminal voltage estimation module 127, the torque estimation module 129 and the torque compensation module 131, illustrated in FIGS. 1A-1B.

As shown in FIG. 3, the machine terminal voltage estimation module 127 generates estimated inverter present phase voltages $V_{AN}$, $V_{BN}$ and $V_{CN}$ relative to a negative rail DC bus voltage and provides the phase voltages $V_{AN}$, $V_{BN}$ and $V_{CN}$ to the torque estimation module 129. As described above the phase voltages $V_{AN}$, $V_{BN}$ and $V_{CN}$ are estimated values of the of the actual inverter output voltages $V_{AN\_actual}$, $V_{BN\_actual}$ and $V_{CN\_actual}$.

The torque estimation module 129 includes a rotor position calculation module 310, a park transformation module 315, a terminal power estimation module 320, an efficiency extraction module 325 and a shaft torque estimation module 330. The torque estimation module 129 generates estimated torque data $T_{est}$ based on the inverter phase voltages $V_{AN}$, $V_{BN}$ and $V_{CN}$. The torque estimation module 129 will be described in further detail below.

The torque compensation module 131 is configured to generate the final torque command data $T_{cmd\_final}$ based on the estimated torque data $T_{est}$ and the raw torque command $T_{cmd}$.

The PWM generation module 112 may provide the machine terminal voltage estimation module 127 with the inverter duty cycle information ($d_a$, $d_b$, $d_c$). The machine terminal voltage estimation module 127 may estimate present phase voltages $V_{AN}$, $V_{BN}$ and $V_{CN}$ of the inverter circuit 188 such that the estimated present phase voltages ($V_{AN}$, $V_{BN}$ and $V_{CN}$) accurately resemble the actual output phase voltages ($V_{AN\_actual}$, $V_{BN\_actual}$ and $V_{CN\_actual}$), as will be described further below.

Machine Terminal Voltage Estimation

The inverter present phase voltages $V_{AN}$, $V_{BN}$ and $V_{CN}$ are determined by the system processor 120 using a machine terminal voltage estimation method according to an example embodiment.

When an IPM machine is running in a flux weakening (high speed) region, the inverter controls a line to machine neutral voltage below a certain threshold voltage. To make the control more difficult, there are machine tolerance factors which can affect the machine line to neutral voltage. For example, steel used in the IPM machine is different between manufactures causing different saturation levels and varying inductance parameters which effect machine terminal voltage. Also, the permanent magnet material used in machine design has different characteristics which affect the back emf voltage value. Additional factors which impact terminal voltage are ambient temperature and initial position offset calibration.

By understanding that each machine has different characteristics, it becomes a challenge when operating in a flux weakening region to ensure the machine's terminal voltage does not exceed a threshold value. If the machine voltage becomes too high, the inverter will lose control of proper current regulation, which can cause increased torque ripple, machine heating, harmonics, and other effects due to loss of control.

At least one example embodiment discloses a control device for controlling a machine. The control device may include a processor, such as the processing system 120 (or, in more detail, the processor 264) configured to select a modulation mode and determine a plurality of terminal phase voltages of the machine based on the selected modulation mode.

At least one example embodiment discloses a control device for controlling an alternating current (ac) machine. The control device may include a processor configured to select a modulation mode from a plurality of modulation modes, determine a plurality of present phase voltages corresponding to phases of an inverter based on the selected modulation mode, the determination compensating for deadtimes associated with the selected modulation mode and phases of the inverter, the inverter configured to drive the ac machine and determine an estimated terminal voltage based on the plurality of present phase voltages.

In an example embodiment, the processor is configured to determine the plurality of present phase voltages of the inverter based on a direction of a carrier wave of the selected modulation mode and polarities of phase currents associated with the plurality of present phase voltages of the inverter when a first modulation mode is the selected modulation mode.

In an example embodiment, the processor is configured to determine the plurality of present phase voltages of the inverter based on polarities of phase currents associated with the plurality of present phase voltages of the inverter and clamped switches in corresponding phases of the inverter when a second modulation mode is the selected modulation mode.

In an example embodiment, the processor is configured to determine the plurality of present phase voltages of the inverter further based on duty ratios of the selected modulation mode associated with the phases, respectively.

In an example embodiment, the processor is configured to determine the plurality of present phase voltages of the inverter based on polarities of currents associated with the plurality of present phase voltages of the machine and clamped switches in corresponding phases of the inverter.

In an example embodiment, the processor is configured to determine a first rotor position, the first rotor position being a rotor position of the machine for transformation of a plurality of phase currents associated with the plurality of present phase voltages of the inverter and determine a second rotor position based on the first rotor position, the second rotor position being a rotor position of the machine for transformation of the plurality of present phase voltages of the inverter, the first rotor position and the second rotor position being different.

In an example embodiment, the processor is configured to the processor is configured to determine the second rotor position such that the second rotor position occurs at a time synchronized with the determination of the plurality of present phase voltages of the inverter.

In an example embodiment, the processor is configured to transform the plurality of present phase voltages of the inverter from three phases to two phases based on the second rotor position and determine the estimated terminal voltage based on the transformed plurality of present phase voltages of the inverter, the estimated terminal voltage being two-phase rotating reference frame voltages.

In an example embodiment, the processor is configured to transform the plurality of present phase voltages of the inverter into two-phase stationary reference frame voltages.

In an example embodiment, the processor is configured to determine the estimated terminal voltage based on the two-phase stationary reference frame voltages, the estimated terminal voltage representing a magnitude of a three phase line to line voltage.

In an example embodiment, the control device is a digital signal processor (DSP).

In an example embodiment, the processor is configured to the selected modulation mode is one of space vector pulse width modulation (SVPWM) and discontinuous pulse width modulation.

At least one example embodiment discloses a method of determining an estimated terminal voltage of an inverter for an alternating current (ac) machine. The method includes selecting a modulation mode from a plurality of modulation modes, determining a plurality of present phase voltages corresponding to phases of an inverter based on the selected modulation mode, the determination compensating for deadtimes associated with the selected modulation mode and phases of the inverter, the inverter configured to drive the ac machine and determining an estimated terminal voltage based on the plurality of present phase voltages.

In an example embodiment, the determining the plurality of present phase voltages determines the plurality of present phase voltages of the inverter based on a direction of a carrier wave of the selected modulation mode and polarities of phase currents associated with the plurality of present phase voltages of the inverter when a first modulation mode is the selected modulation mode.

In an example embodiment, the determining the plurality of present phase voltages determines the plurality of present phase voltages of the inverter based on polarities of phase currents associated with the plurality of present phase voltages of the inverter and clamped switches in corresponding phases of the inverter when a second modulation mode is the selected modulation mode.

In an example embodiment, the determining the plurality of present phase voltages determines the plurality of present phase voltages of the inverter further based on duty ratios of the selected modulation mode associated with the phases, respectively.

In an example embodiment, the determining the plurality of present phase voltages determines the plurality of present phase voltages of the inverter based on polarities of currents associated with the plurality of present phase voltages of the machine and clamped switches in corresponding phases of the inverter.

In an example embodiment, the determining the estimated terminal voltage includes determining a first rotor position, the first rotor position being a rotor position of the machine for transformation of a plurality of phase currents associated with the plurality of present phase voltages of the inverter and determining a second rotor position based on the first rotor position, the second rotor position being a rotor position of the machine for transformation of the plurality of present phase voltages of the inverter, the first rotor position and the second rotor position being different.

In an example embodiment, the determining the second rotor position determines the second rotor position such that the second rotor position occurs at a time synchronized with the determination of the plurality of present phase voltages of the inverter.

In an example embodiment, the determining the estimated terminal voltage includes transforming the plurality of present phase voltages of the inverter from three phases to two phases based on the second rotor position and determining the estimated terminal voltage based on the transformed plurality of present phase voltages of the inverter, the estimated terminal voltage being two-phase rotating reference frame voltages.

In an example embodiment, the determining the estimated terminal voltage includes transforming the plurality of present phase voltages of the inverter into two-phase stationary reference frame voltages.

In an example embodiment, the determining the estimated terminal voltage determines the estimated terminal voltage based on the two-phase stationary reference frame voltages, the estimated terminal voltage representing a magnitude of a three phase line to line voltage.

In an example embodiment, the selected modulation mode is one of space vector pulse width modulation (SVPWM) and discontinuous pulse width modulation.

Figure 4:
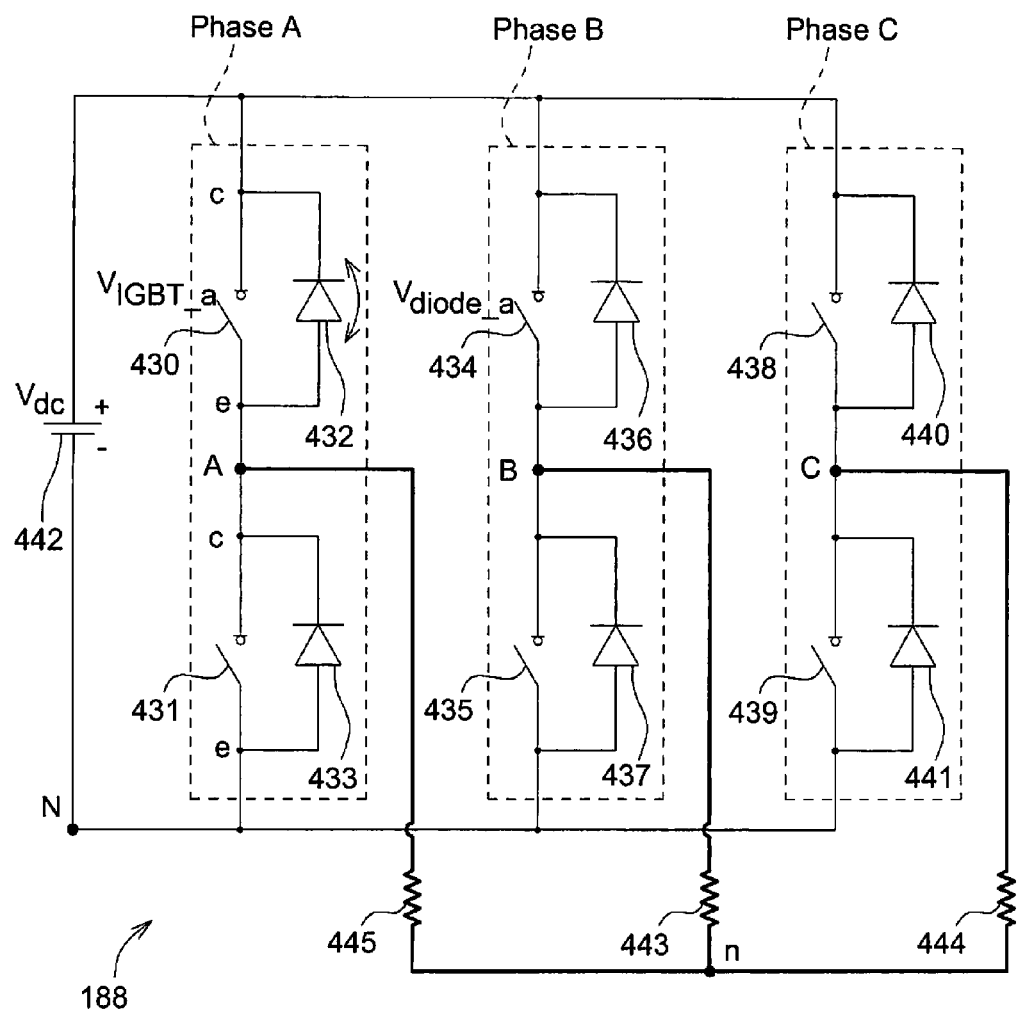

FIG. 4 illustrates an inverter circuit configured to output control signals to an electrical motor, according to an example embodiment. The inverter circuit 188 includes electrical components including, but not limited to, switching semiconductors (430-431, 434-435 and 438-439), diodes (432-433, 436-437 and 440-441), motor phase impedance 443-445, a dc-bus voltage 442 to generate, modify and control pulse-width modulated signals or other alternating current signals (e.g., pulse, square wave, sinusoidal, or other waveforms) applied to the motor 117 of FIG. 1A.

To prevent shoot through at the output of the inverter circuit 188, a dead time or blanking time is introduced in PWM switching, which may cause mismatching between the d/q-axis voltage commands Vd* and Vq* and the actual phase output voltages (e.g., $V_{AN\_actual}$, $V_{BN\_actual}$ and $V_{CN\_actual}$). During the dead time, neither the top switch nor the bottom switch of any given phase of the inverter circuit 188 conducts. In one example embodiment, switches 430, 434 and 438 constitute the top switches of one of the phases A, B and C, respectively, while switches 431, 435 and 439 constitute the bottom switches of one of the phases A, B and C, respectively.

During the dead time, the actual inverter output voltages $V_{AN\_actual}$, $V_{BN\_actual}$ and $V_{CN\_actual}$ are determined based on the direction of current flowing through one of the top or bottom diodes of one of the phases (e.g., diodes 432 or 433 corresponding to phase A). The dead time impact on the mismatching between the d/q-axis voltage commands Vd* and Vq* (converted into three phase duty cycles ($d_a$, $d_b$, $d_c$ via the pulse width modulation generation module 112) and the actual present phase voltages $V_{AN\_actual}$, $V_{BN\_actual}$ and $V_{CN\_actual}$, may also depend on other factors including, but not limited to, the PWM switching frequency as the percentage ratio of a fixed dead time period of a PWM period varies as the PWM switching frequency changes, and motor operating mode. For example, when the motor 117 is running in motoring mode, the actual inverter terminal voltage is less than the d/q-axis voltage commands, while when the motor 117 is running in braking mode, the actual inverter terminal voltage is higher than the d/q-axis voltage commands. As a result, the d/q-axis commands may not be a good indicator of the actual terminal voltage indicator due to the described mismatching.

Voltage drops across switches and diodes of the inverter circuit 188 also contribute to the mismatching. For example, when one of the top or bottom switches of any given phase of the inverter circuit 188 conducts, there may be a voltage drop across a switch and/or a diode associated with one of the phases. For example, when the top switch 430 associated with phase A conducts, there may be a voltage drop across the switch 430 or the diode 432, which may be referred to as $V_{IGBT\_a}$ of switch 430 or $V_{diode\_a}$ of diode 432, respectively.

Therefore, accurately estimating the inverter present phase $V_{AN}$, $V_{BN}$ and $V_{CN}$ enables the system to account for the mismatching between the estimated present phase voltages $V_{AN}$, $V_{BN}$ and $V_{CN}$ and the actual present phase voltages $V_{AN\_actual}$, $V_{BN\_actual}$ and $V_{CN\_actual}$ and accordingly adjust the d/q-axis current commands. The adjustment may in turn enable compensating for the extra high terminal voltage at the machine, thus assuring motor control stability.

The estimation of the actual terminal voltages and adjustment of the d/q-axis current commands will be described below.

Figure 5:
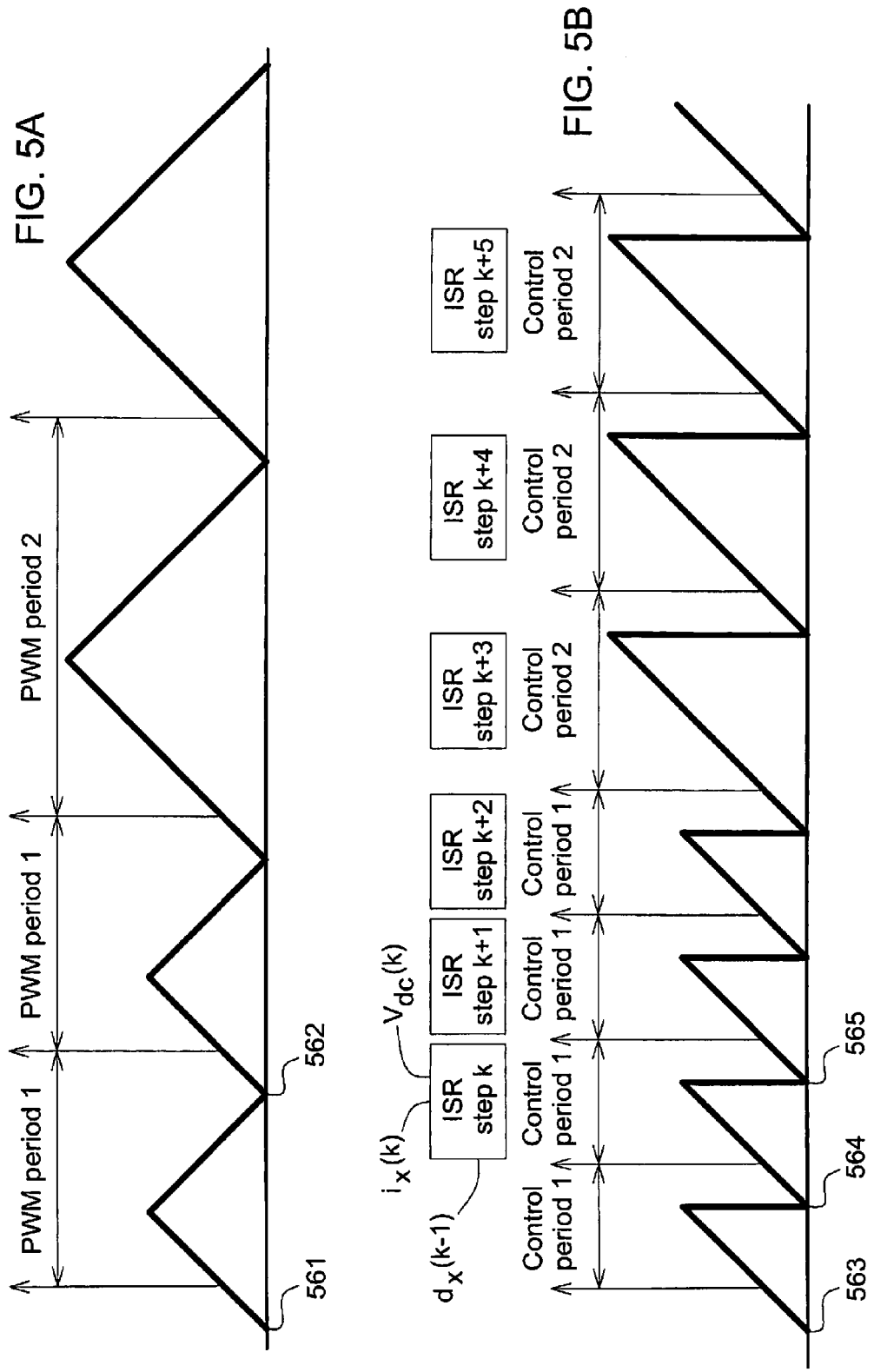

FIGS. 5A-B illustrate a pulse width modulation (PWM) cycle and a double control period of the pulse width modulation module of FIGS. 1A-1B, for a double control mode, according to an example embodiment. FIG. 5A illustrates a PWM carrier wave. A single PWM cycle may be defined as the time from a rising edge on the signal to the next rising edge of the signal. For example, 561 to 562 defines one PWM cycle in FIG. 5A.

FIG. 5B depicts a double control mode, in which case there are two control signals per PWM cycle (e.g., 1 control signal per half of a single PWM cycle, where PWM cycle is defined from 563 to 565 (e.g., same as the PWM cycle in FIG. 5A), and half a cycle is defined as 563 to 564 and 564 to 565 as shown in FIG. 5B. Therefore, in the example embodiment where the PWM switching frequency is 5 kHz and measurements are sampled at 25 MHz (e.g., 40 ns), then for the case of double control mode, there will be half as many counts (e.g., measurements) of $V_{xN}$ (e.g. 2500), where X is one of the phases a, b, or c in each control period. As can be seen from FIGS. 5A-5B, PWM cycles may not be the same and may differ from one cycle to another due to, for example, varying PWM switching frequency.

In an example embodiment, the machine terminal voltage estimation module 127 samples the present DC bus voltage, present phase currents, and a unit delay of each of three previous duty cycles in every double control period to estimate the machine terminal voltage. The previous duty cycle values are used due to the fact that the present calculated duty cycle will be used in the next control period.

Figure 6:
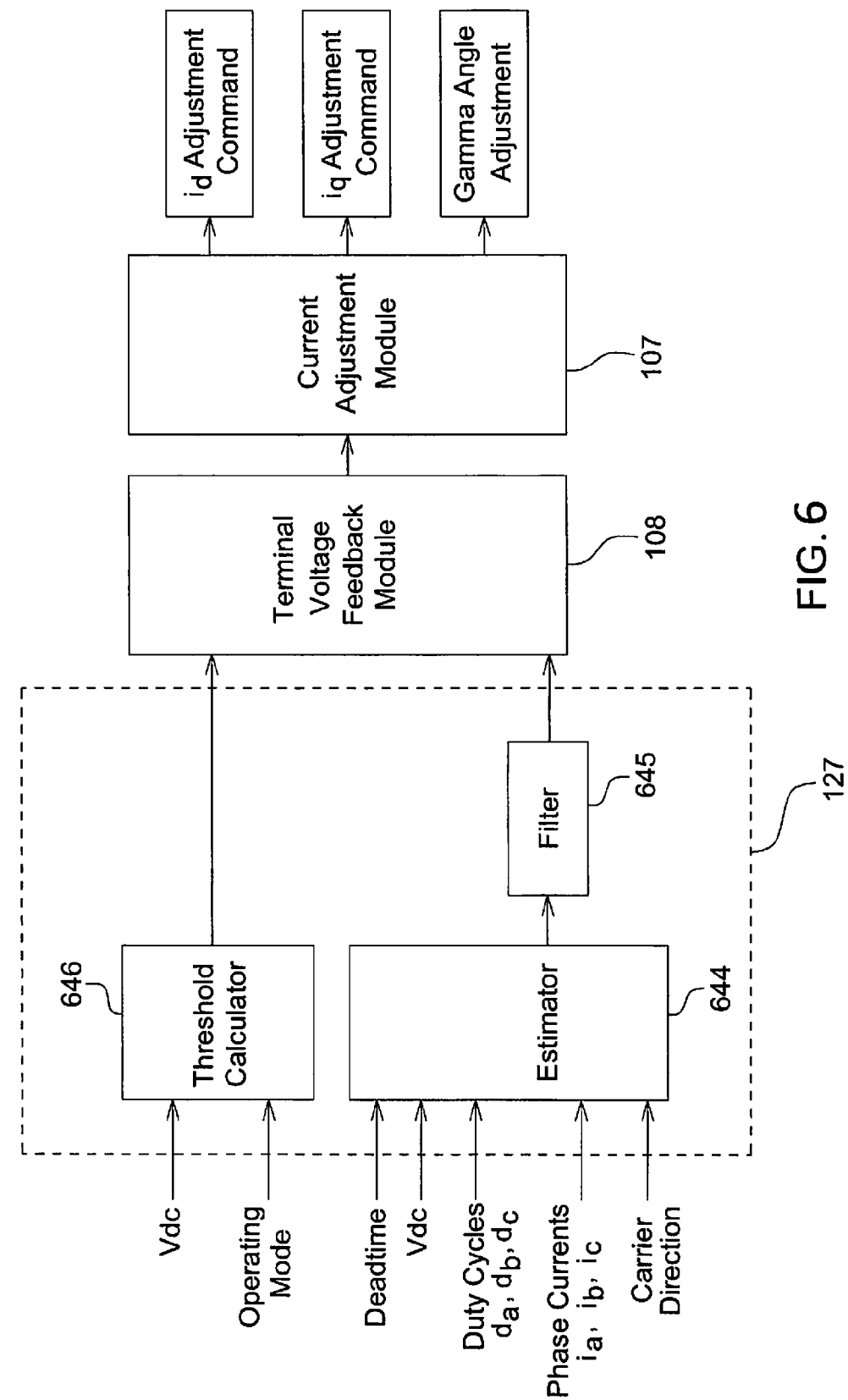

FIG. 6 illustrates particular modules, including the machine terminal voltage estimation module 127 of the system shown in FIG. 1A, according to an example embodiment. In particular, FIG. 6 illustrates the machine terminal voltage estimation module 127, the terminal voltage feedback module 108 and the current adjustment module 107. The machine terminal voltage estimation module 127 may include an estimator 644 for estimating a three-phase line to negative rail averaging voltage ($V_{AN}$, $V_{BN}$ and $V_{CN}$), as will be described below. The machine terminal voltage estimation module 127 may further include a filter 645 for filtering the estimated line to negative rail voltage, as will be described below. The machine terminal voltage estimation module 127 may further include a threshold calculation module 646, which calculates a terminal voltage threshold, as will be described below. The terminal voltage threshold may then be used in determining a terminal voltage feedback, as will be described below. Furthermore, FIG. 6 illustrates the terminal voltage feedback module 108 shown in FIG. 1A, which determines the terminal voltage feedback based on the terminal voltage threshold and the estimated terminal voltage, as will be described below. FIG. 6 also illustrates the current adjustment module 107, shown in FIG. 1, which adjusts the d/q-axis current commands based on the terminal voltage feedback, as will be described below.

As discussed earlier, the modules depicted in FIG. 6 may be executed by the system processor 120, shown in FIGS. 1A-1B, and implemented on a variety of hardware including, but not limited programmable logic devices such as a digital signal processor or FPGA. For example, the processor 264 may be programmed to execute the module shown in FIGS. 1A-1B.

Figure 7:
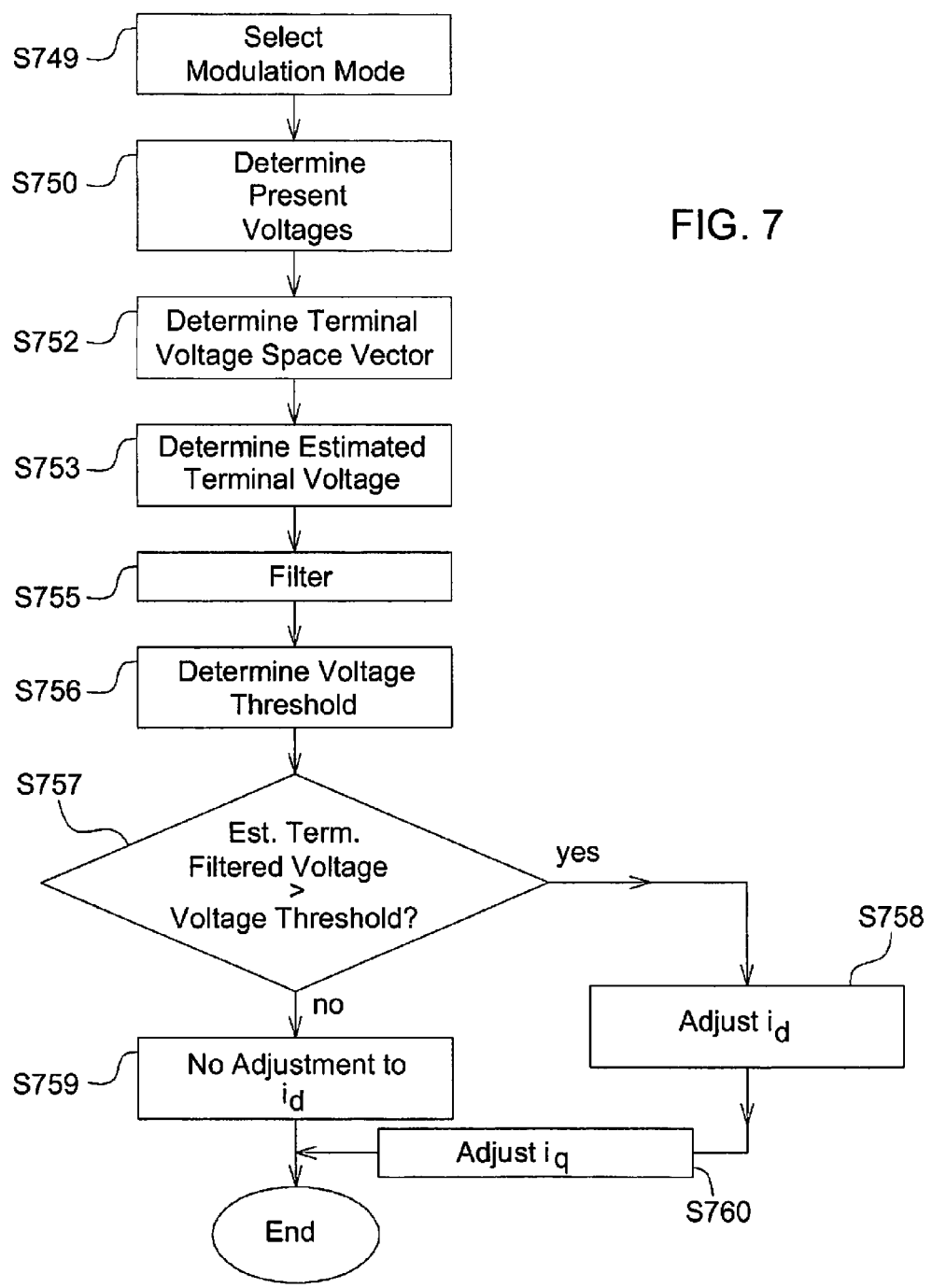

FIG. 7 illustrates a DSP based method carried out by the machine terminal voltage estimation module, terminal voltage feedback module and current adjustment module, shown in FIG. 6, according to an example embodiment.

At S749, the system processor 120 selects a modulation mode. For example, the system processor may select space vector pulse width modulation (SVPWM) or discontinuous pulse width modulation as the selected modulation mode. In an example embodiment, the system processor 120 may select between SVPWM and DPWM based on a modulation index. The modulation index is the ratio between a desired output voltage and the available DC bus voltage. While an example is described below with regards to DPWM2, it should be understood that the discontinuous pulse width modulation (DPWM) mode may be DWPM1, DPWM2, DPWM3 or dynamic DPWM.

The processor 120 may switch between SVPWM and the DPWM2 equations based on the selected modulation mode. For example, if DPWM2 is selected and the current sector is "1", the processor 120 uses the DPWM2 equations to estimate the phase a voltage and uses SVPWM equations to estimate phase b and phase c voltages. If DPWM2 is not active, the processor 120 uses the SVPWM equations to estimate the phase voltages.

At S750, the system processor 120, via estimator 644 shown in FIG. 6, determines a plurality of present phase voltages (present control step voltages) $V_{XN}$ based on the selected modulation mode. The estimator 644 utilizes inputs such as the plurality of voltages using a plurality of data including, but not limited to, a $d_c$-bus voltage, duty cycle for driving each phase of the inverter circuit 188, the instantaneous current polarity, a voltage across at least one switch associated with the corresponding phase of the inverter circuit 188, and the deadtime (or blanking time) of the inverter circuit 188.

Estimation for SVPWM

The machine terminal voltage estimation module 127 uses four different equations used to calculate the present phase voltages $V_{XN}$ depending on two parameters, the phase current polarity and the carrier direction. The first parameter, carrier direction, is based on the slope of the PWM carrier waveform (shown in FIG. 5A). For the case of the double control, a positive PWM carrier waveform slope correlates to a carrier direction of one, and a negative PWM carrier waveform slope is equal to a carrier direction of zero. The machine terminal voltage estimation module 127 may determine the carrier direction using any known method.

The second parameter used to select the $V_{XN}$ equation, is the current polarity. The current polarity may be determined by the secondary processing module 116, for example. If phase current is positive, the present (present control step) $V_{XN}$ values can be calculated by the machine terminal voltage estimation module 127, as described below.

The table below shows the four possible combinations of the carrier direction and current polarity and the associated $V_{XN}$ equation.

TABLE 1

| Carrier Dir. (1 = pos, 0 = neg) | Current Polarity (1 = pos, 0 = neg) | $V_{XN}$ Equations |
|---|---|---|
| 0 | 0 | $V_{XN} = (V_{dc} + V_{diode\_x})(d_x + \tau) + V_{igbt}(1 - d_x - \tau)$ |
| 0 | 1 | $V_{XN} = (V_{dc} - V_{IGBT\_x})(d_x) - V_{diode\_x}(1 - d_x)$ |
| 1 | 0 | $V_{XN} = (V_{dc} - V_{diode\_x})(d_x) + V_{IGBT\_x}(1 - d_x)$ |
| 1 | 1 | $V_{XN} = (V_{dc} - V_{IGBT\_x})(d_x - \tau) - V_{diode\_x}(1 - d_x + \tau)$ | where $\tau$ is the deadtime ratio, where $\tau = 2*\text{deadtime}*\text{switching frequency}$ (1)

$V_{IGBT\_x}$ is the voltage across the switch (IGBT) of the corresponding phase x, $V_{diode\_x}$ is the voltage across the switch (diode) of the corresponding phase x and $d_x$ is the modulation duty cycle of phase X.

The deadtime is an inverter parameter. The deadtime can be a different value based on different IGBTs and different switching frequencies. In other words, the deadtime may be determined by the IGBT hardware. As described, deadtime is the time between one IGBT turning off in a phase leg before the other IGBT in the same phase leg can turn on to prevent a shoot-through condition.

The equations shown in Table 1 may be implemented using a DSP. However, it should be understood that the equations in Table 1 may be modified to be performed using an FPGA. For example the $V_{XN}$ equations may be different because the FPGA based terminal voltage estimation knows exactly when the switches are on and off. The DSP may not have the capability to know when the switches are on and off.

Estimation for DPWM2 Mode

The machine terminal voltage estimation module 127 uses four different equations used to calculate the present phase voltages $V_{XN}$ when in DPWM2 mode. The machine terminal voltage estimation module 127 selects the correct equation based on two parameters, the phase current polarity and the phase switch clamping. The table below shows the phase switch clamping information based on the sector number.

TABLE 2

| Sector Number | Phase switch Clamped |
|---|---|
| 1 | Phase A Top (switch 430) |
| 2 | Phase C Bottom (switch 439) |
| 3 | Phase B Top (switch 434) |
| 4 | Phase A Bottom (switch 431) |
| 5 | Phase C Top (switch 438) |
| 6 | Phase B Bottom (switch 435) |

As should be understood, the clamping pattern is different between DPWM1, DPWM2, and DPWM3. The clamping patterns are based on the instantaneous voltage space vector. Based on the angle of the voltage space vector a sector number is determined by the processor 120 and a corresponding phase switch is clamped.

The current polarity may be determined by the secondary processing module 116, for example. If phase current is positive the following present $V_{XN}$ values are calculated by the system processor 120 (using the machine terminal voltage estimation module 127):

$I_x$ is positive and top switch is clamped, then $V_{xN}=V_{dc}-V_{IGBT}$ (2)

$I_x$ is positive and bottom switch is claimed, then $V_{xN}=-V_{diode}$ (3)

If phase current is negative the following present $V_{XN}$ values are calculated by the system processor 120 (using the machine terminal voltage estimation module 127):

$I_x$ is negative and bottom switch is clamped, then $V_{xN}=V_{IGBT}$ (4)

$I_x$ is negative and top switch is clamped, then $V_{xN}=Vdc+V_{diode}$ (5)

For every count, the system processor 120, in one example embodiment, determines a present control step voltage $V_{xN}$ for each phase, based on a current polarity in the inverter circuit 188.

At any given one time for a given phase of the inverter circuit 188, either the top or bottom switch is turned on or they may both be off (e.g., dead time or blanking time as described above). For example, the length of time, during each PWM cycle, where the top or bottom switches are turned on may depend on a duty cycle associated with each switch of each phase in a given PWM cycle. For example, the duty cycle of switch 430 associated with phase A may be 40% percent, which means that in any given PWM cycle, switch 430 is on for 40% percent of the time while switch 431 is on for 60% of the time in an ideal case without deadtime inserted. However, as discussed above, in any given PWM cycle, a very small amount of dead time is introduced during which neither the top or bottom switch is turned on (e.g., 3 micro seconds), in order to prevent shoot through.

Furthermore, the switches may be turned on or off via the gate drive signals/voltages, which may constitute relatively small amount of voltage needed to turn on/off a given transistor (e.g., the IGBT transistor operating as switch 430).

The plurality of present phase voltages $V_{AN}$, $V_{BN}$ and $V_{CN}$ are instantaneous voltage calculations (performed by the processor 120) and are the average voltage for the current regulation interval. The processor 120 takes one sample of $V_{XN}$ for each phase per current regulation interval.

In an example embodiment utilizing FPGA, the processor 120 determines a plurality of instantaneous voltages (e.g., 2500 measurements for $V_{AN}$, $V_{BN}$ and $V_{CN}$ in a double control mode shown in FIG. 6B), the processor 120, at step S751, averages the instantaneous voltages over one active current regulation interval.

The processor 120 may average the instantaneous voltages (also referred to as line-to-negative rail averaging voltage), $V_{XN}$, based on:

$$V_{XN} = \frac{1}{T} \cdot \sum_{k=1}^{T} V_{XN}(k) \quad (6)$$

where T is the total number of counts/measurement samples per PWM cycle or per control interval (e.g., 5000 counts per PWM cycle and per control interval in a single control mode or 2500 counts per control mode in a double control mode (assuming a frequency of 5 kHz and a sampling rate of 25 mHz (e.g., 40 ns)).

Returning to the DSP based method in FIG. 7, at S752, the system processor 120 determines a terminal voltage vector space using the present phase voltages $V_{XN}$. The processor 120 determines the terminal voltage vector space based on:

$$\vec{V}_s = \frac{2}{3} \cdot \left( V_{AN} + V_{BN} \cdot e^{j\frac{2\pi}{3}} + V_{CN} \cdot e^{j\frac{4\pi}{3}} \right) \quad (7)$$

The processor 120 splits the real and imaginary parts of the space vector $V_s$, in order to calculate the magnitude of the space vector $V_s$, based on:

$$V_{s\_real} = \frac{2}{3} \cdot \left( V_{AN} + V_{BN} \cdot \cos\left(\frac{2\pi}{3}\right) + V_{CN} \cdot \cos\left(\frac{4\pi}{3}\right) \right) \quad (8)$$

$$V_{s\_imag} = \frac{2}{3} \cdot \left( V_{BN} \cdot \sin\left(\frac{2\pi}{3}\right) + V_{CN} \cdot \sin\left(\frac{4\pi}{3}\right) \right) \quad (9)$$

By calculating the magnitude of the space vector $V_s$, the processor 120 determines the line-to-neutral terminal voltage peak (S753), which is the estimated terminal voltage, based on:

$$\text{Estimated Terminal Voltage} = V_{term\_est} = V_{line-neutral-peak} = \sqrt{(V_{s\_real}^2 + V_{s\_imag}^2)} \quad (10)$$

At S755, the system processor 120 may filter the estimated terminal voltage. The system processor 120 may filter the estimated terminal voltage because the estimated terminal voltage may include undesired oscillations. Therefore, in order to provide a smoother control feedback signal, a filtering may be performed to eliminate the undesired oscillations. In one example embodiment, the filtering may be based on low-pass filtering of the estimated terminal voltage. In an example embodiment, the low-pass filtering may constitute calculating a moving average of the estimated terminal voltage.

At S756, the system processor 120, via the threshold calculation module 127 (the threshold calculator 646), may determine a line-to-neutral peak voltage threshold (terminal voltage threshold) by:

$$\vec{V}_{term\_max} = \frac{Vdc}{\sqrt{3}} \quad (11)$$

The square root of three is used to limit the terminal voltage to the linear region of the space vector pulse width modulation scheme. The DC bus voltage Vdc is a dynamic value and the terminal voltage will therefore also be a dynamic value dependent upon the DC bus voltage Vdc.

Then there are two gains (terminal voltage limit gain motoring mode & terminal voltage limit gain braking mode), and depending on the operating mode, the processor selects the corresponding gain to be multiplied by the terminal voltage threshold. The gains are selected to limit the terminal voltage from a maximum value of $V_{term\_max}$ down to a lower value. The value is can be different for different applications where a user may want to limit voltage to 460V, or perhaps to 440V.

The system processor 120 adjusts the terminal voltage threshold by a gain to further reduce maximum output voltage during motor and/or braking operating conditions (allowing a user to reduce the terminal voltage threshold to a select value) by:

$$\vec{V}_{term\_motoring\_limited\_max} = \quad (12)$$
$$\frac{Vdc}{\sqrt{3}} * (\text{Terminal Voltage Limit Gain\_Motoring Mode})$$
where
$0 < \text{Gain} < 1$ $$\vec{V}_{term\_generating\_limited\_max} = \quad (13)$$
$$\frac{Vdc}{\sqrt{3}} * (\text{Terminal Voltage Limit Gain\_Braking Mode})$$
where
$0 < \text{Gain} < 1$ The gains may be selected by the processor 120 in accordance with a selected maximum voltage.

The system processor 120 may determine if the moving average filtered estimated terminal voltage is different than the actual machine terminal voltage. If so, the estimated terminal voltage can be modified by adding offset parameters to the estimated terminal voltage value.

To determine the difference, the system processor 120 compares the estimated voltage to the actual measured (power analyzer or oscilloscope) terminal voltage. This comparison is done in an algorithm development phase to obtain offset parameters. Once the offsets have been determined, the actual voltage does not need to be measured.

The system processor 120 determines the modified estimated terminal voltage for the motoring and braking modes by:

$$\vec{V}_{term\_estimated\_motoring\_offset} = \vec{V}_{term\_est} + (\text{Terminal Voltage Offset\_Motoring Mode}) \quad (14)$$

$$\vec{V}_{term\_estimated\_braking\_offset} = \vec{V}_{term\_est} + (\text{Terminal Voltage Offset\_Braking Mode}) \quad (15)$$

where Terminal Voltage Offset_Motoring Mode is the offset for the motoring mode and Terminal Voltage Offset_Braking Mode is the offset for the braking mode.

The offset parameters Terminal Voltage Offset_Motoring Mode and Terminal Voltage Offset_Braking Mode may be determined by empirical data. For example, to select the offset parameter values, the system processor 120 may disable a terminal voltage compensation enable parameter to prevent feedback control. By doing this, the estimated terminal voltage will still be calculated even though the closed loop control is disabled. The system processor 120 compares the estimated terminal voltage values against the power analyzer actual machine terminal voltage values for motoring and braking conditions. The system processor 120 adjusts the offset parameters Terminal Voltage Offset_Motoring Mode and Terminal Voltage Offset_Braking Mode accordingly for motoring and braking operations such that the estimated terminal voltage and the actual measured terminal voltage are equal and/or close to equal to each other.

At S757, the system processor 120, via the terminal voltage feedback module 108, shown in FIGS. 1A and 6, determines a terminal voltage feedback. The system processor 120 may determine the terminal voltage feedback by determining a difference between a filtered estimated terminal voltage (after determining whether any offsets are to be applied) and the terminal voltage threshold (after determining whether the terminal voltage threshold is to be adjusted by a gain). In an example embodiment, the offsets and gains are always applied to the terminal voltage threshold and estimated terminal voltage.

If the filtered estimated terminal voltage exceeds the terminal voltage threshold, the processor 120, via the current adjustment module 107 and using the difference as a feedback parameter, may adjust the d-axis current command by decreasing the d-axis current command (S758). If the d-axis current needs to be modified it will change from a negative value (e.g., −110 A) to a negative value having a magnitude is greater than the initial d-axis current command (e.g., −150 A).

However, if the filtered estimated terminal voltage is lower than the terminal voltage threshold, the processor 120 makes no adjustment in the d-axis current command (S759). At S760, the processor 120 adjusts the q-axis current command based on the adjustment of the d-axis current command so as to keep the total current magnitude constant. Therefore, if no adjustment is made to the d-axis current command at S759, then no subsequent adjustment to q-axis current command is made at S760, either.

The loop feedback described with reference to steps S757-S760 may be performed by a proportional integral (PI) controller in the system processor 120.

Figure 8:
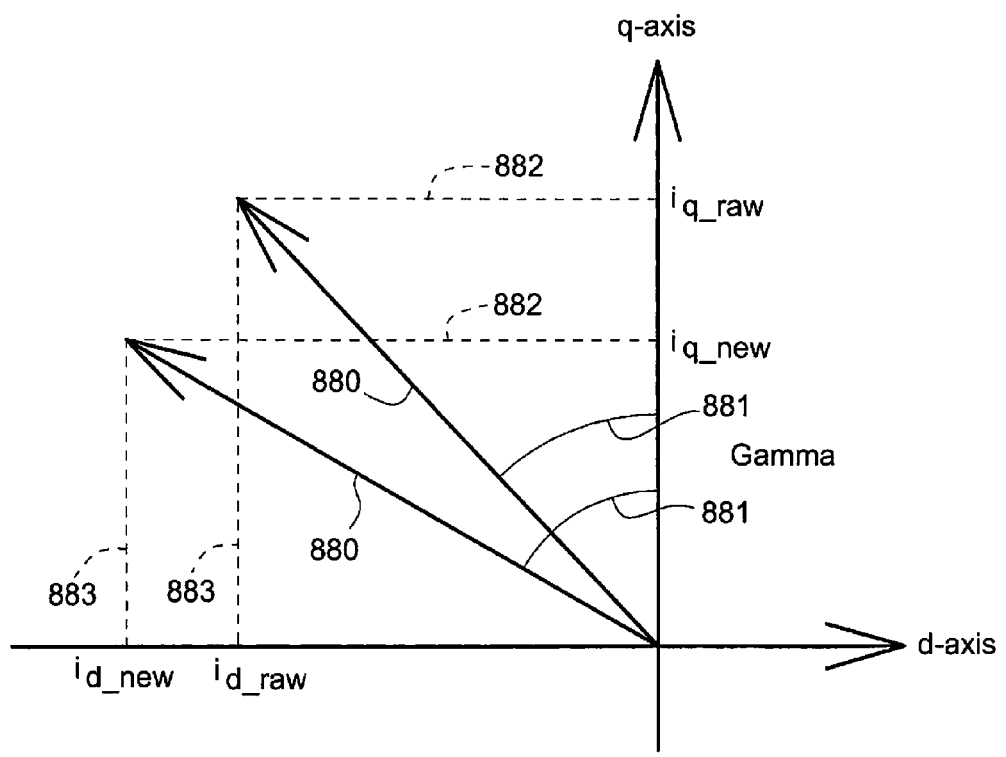

FIG. 8 illustrates adjustments to the d/q-axis current magnitudes and the corresponding angle such that the total current magnitude is kept constant, according to an example embodiment. Keeping the total current magnitude 880 the same (by adjusting the d-axis current command 882 and q-axis current command 883) while changing the gamma angle 881 may enable a better control of the machine terminal voltage and avoiding excessive heating in motor windings on the inverter circuit 188.

Referring to FIGS. 1 and 6, in one example embodiment, the current adjustment module 107 may be executed by the system processor 120 in order to determine the d/q-axis current adjustment command and the gamma angle (designated as id adjustment command, iq adjustment command and Gamma angle adjustment in FIG. 6).

The adjustments to the d/q-axis current commands such that the total current magnitude is kept constant may be based on the following calculations:

$$I_{s\_cmd} = \sqrt{I_{d\_cmd\_raw}^2 + I_{q\_cmd\_raw}^2} \quad (16)$$

where $I_s$ 880 of FIG. 8 is the total current magnitude. The adjustment to the d-axis current command 882 may be determined based on:

$$I_{d\_cmd\_new} = I_{d\_cmd\_raw} - I_{d\_cmd\_adjusted} \quad (17)$$

Therefore, given (1) and (2), the adjustment to the q-axis current command 883 may be determined based on:

$$I_{q\_cmd\_new} = \sqrt{I_{s\_cmd}^2 - I_{d\_cmd\_new}^2} \quad (18)$$

Further details regarding how the processor 120 may determine the error as well as the adjustments to the d/q-axis current command are described in another patent application by the inventors (U.S. Pub. 2012/0217923), incorporated herein by reference, in its entirety.

Torque Observation and Compensation

The torque accuracy of a lookup table based control scheme is normally affected by the machine parameters variation and abnormal operating conditions such as inductances and flux linkage produced by a permanent magnet.

Machine steel characteristics variation from different suppliers can cause different saturation behavior along d/q-axis and accordingly vary inductances $L_d/L_q$. These machine parameter variations can change the generated torque for a selected current operating point.

By understanding that each machine has different characteristics and different behavior on parameter variation, it becomes difficult to achieve accurate torque production by using lookup table only based method.

To increase the robustness to these uncertainties and maintain high accuracy torque production, the inventors have discovered a torque estimation scheme and a torque compensator. The torque observer scheme estimates an instantaneous shaft output torque. And a close-loop torque compensation scheme adjusts the current command based on the difference between the raw torque command and the estimated torque, such that the generated shaft torque can still follow the raw reference torque under machine parameter variation and different operating conditions.

At least one example embodiment discloses a method of estimating shaft torque of an alternating current machine. The method includes determining phase current command values, estimating terminal voltage values based on actual phase current values and based on at least one of a duty cycle and a dead time ratio of the machine, transforming the terminal voltage values to derive direct and quadrature voltage representations consistent with the current command values, determining a terminal power of one or more terminals of the machine, the terminal power directly based on the direct and quadrature voltage representations of the machine and current command values and determining an estimated shaft torque of the machine based on the terminal power in accordance with at least one efficiency value based on machine parameters from a characterization of the machine.

In an example embodiment, the method further includes adjusting a torque command applied to the machine such that the estimated shaft torque substantially equals a torque command for a sampling interval.

In an example embodiment, the efficiency value varies with at least one of the torque command and a voltage over speed ratio.

In an example embodiment, the adjusting the torque command includes determining an error between the torque command and the estimated shaft torque, generating a saturated torque value based on the error and generating the adjusted torque command based on the saturated torque value.

In an example embodiment, the adjusting the torque command includes generating the adjusted torque command based on a proportional integral (PI) function.

In an example embodiment, the method further includes determining an operating mode, the operating mode being one of a braking mode and a motoring mode and obtaining an efficiency table associated with the operating mode, the efficiency table including efficiency values corresponding to torque command percentages and voltage-speed ratios, respectively, the efficiency table being stored in a storage device and the efficiency table including the at least one efficiency value.

In an example embodiment, the method further includes receiving an input torque command percentage and an input voltage-speed ratio and determining an estimated shaft power based on the terminal power and the efficiency value corresponding to the input torque command percentage and the input voltage-speed ratio.

In an example embodiment, the determining the estimated shaft torque includes determining a shaft torque based on the estimated shaft power and speed of the shaft and determining the estimated shaft torque by filtering the shaft torque.

At least one example embodiment discloses a method of estimating shaft torque of an alternating current machine. The method includes measuring phase currents associated with one or more stator windings of the machine, estimating terminal voltage values based on the measured phase currents representations of the machine and based on at least one of a duty cycle and a dead time ratio of the machine, transforming the terminal voltage values to derive direct and quadrature voltage representations consistent with the measured phase currents, determining a terminal power of one or more terminals of the machine, the terminal power directly based on one of the estimated terminal voltage values and direct and quadrature voltage representations of the machine and current command values and determining an estimated shaft torque of the machine based on the terminal power in accordance with at least one efficiency value based on machine parameters from a characterization of the machine.

In an example embodiment, the method further includes adjusting a torque command applied to the machine such that the estimated shaft torque substantially equals a torque command for a sampling interval.

In an example embodiment, the efficiency value varies with at least one of the torque command and a voltage over speed ratio.

In an example embodiment, the adjusting the torque command includes determining an error between the torque command and the estimated shaft torque, generating a saturated torque value based on the error and generating the adjusted torque command based on the saturated torque value.

In an example embodiment, the adjusting the torque command includes generating the adjusted torque command based on a proportional integral (PI) function.

In an example embodiment, the method further includes determining an operating mode, the operating mode being one of a braking mode and a motoring mode and obtaining an efficiency table associated with the operating mode, the efficiency table including efficiency values corresponding to torque command percentages and voltage-speed ratios, respectively, the efficiency table being stored in a storage device and the efficiency table including the at least one efficiency value.

In an example embodiment, the method further includes receiving an input torque command percentage and an input voltage-speed ratio and determining an estimated shaft power based on the terminal power and the efficiency value corresponding to the input torque command percentage and the input voltage-speed ratio.

In an example embodiment, the determining the estimated shaft torque includes determining a shaft torque based on the estimated shaft power and speed of the shaft and determining the estimated shaft torque by filtering the shaft torque. At least one example embodiment discloses a system including a processor configured to determine phase current command values associated with an alternating current machine, estimate terminal voltage values based on actual phase current values and based on at least one of a duty cycle and a dead time ratio of the alternating current machine, transform the terminal voltage values to derive direct and quadrature voltage representations consistent with the current command values, determine a terminal power of one or more terminals of the machine, the terminal power directly based on the direct and quadrature voltage representations of the machine and the current command values and determine an estimated shaft torque of the machine based on the terminal power in accordance with at least one efficiency value based on machine parameters from a characterization of the machine.

In an example embodiment, the processor is configured to adjust a torque command applied to the machine such that the estimated shaft torque substantially equals a torque command for a sampling interval.

In an example embodiment, the efficiency value varies with at least one of the torque command and a voltage over speed ratio.

In an example embodiment, the processor is configured to determine an error between the torque command and the estimated shaft torque, generate a saturated torque value based on the error and generate the adjusted torque command based on the saturated torque value.

In an example embodiment, the processor is configured to generate the adjusted torque command based on a proportional integral (PI) function.

In an example embodiment, the processor is configured to determine an operating mode, the operating mode being one of a braking mode and a motoring mode and obtain an efficiency table associated with the operating mode, the efficiency table including efficiency values corresponding to torque command percentages and voltage-speed ratios, respectively, the efficiency table being stored in a storage device and the efficiency table including the at least one efficiency value.

In an example embodiment, the processor is configured to receive an input torque command percentage and an input voltage-speed ratio and determine an estimated shaft power based on the terminal power and the efficiency value corresponding to the input torque command percentage and the input voltage-speed ratio.

In an example embodiment, the processor is configured to determine a shaft torque based on the estimated shaft power and speed of the shaft and determine the estimated shaft torque by filtering the shaft torque.

At least one example embodiment discloses a system including a processor configured to measure phase currents associated with one or more stator windings of an alternating current machine, estimate terminal voltage values based on the measured phase currents representations of the machine and based on at least one of a duty cycle and a dead time ratio of the machine, transform the terminal voltage values to derive direct and quadrature voltage representations consistent with the measured phase currents, determine a terminal power of one or more terminals of the machine, the terminal power directly based on one of the estimated terminal voltage values and direct and quadrature voltage representations of the machine and current command values and determine an estimated shaft torque of the machine based on the terminal power in accordance with at least one efficiency value based on machine parameters from a characterization of the machine.

In an example embodiment, the processor is configured to adjust a torque command applied to the machine such that the estimated shaft torque substantially equals a torque command for a sampling interval.

In an example embodiment, the efficiency value varies with at least one of the torque command and a voltage over speed ratio.

In an example embodiment, the processor is configured to determine an error between the torque command and the estimated shaft torque, generate a saturated torque value based on the error and generate the adjusted torque command based on the saturated torque value.

In an example embodiment, the processor is configured to generate the adjusted torque command based on a proportional integral (PI) function.

In an example embodiment, the processor is configured to determine an operating mode, the operating mode being one of a braking mode and a motoring mode and obtain an efficiency table associated with the operating mode, the efficiency table including efficiency values corresponding to torque command percentages and voltage-speed ratios, respectively, the efficiency table being stored in a storage device and the efficiency table including the at least one efficiency value.

In an example embodiment, the processor is configured to receive an input torque command percentage and an input voltage-speed ratio and determine an estimated shaft power based on the terminal power and the efficiency value corresponding to the input torque command percentage and the input voltage-speed ratio.

In an example embodiment, the processor is configured to determine a shaft torque based on the estimated shaft power and speed of the shaft and determine the estimated shaft torque by filtering the shaft torque.

Referring back to FIG. 3, the torque estimation module 129 generates estimated torque data $T_{est}$ based on the inverter phase voltages $V_{AN}$, $V_{BN}$ and $V_{CN}$, generated from the machine terminal voltage estimation described above.

As will be described in greater detail below, the torque estimation module 129 estimates terminal power directly based on terminal voltage and current commands. An efficiency converts the terminal power into shaft power. The current commands are used instead of actual current to reduce oscillation in estimated power. The torque estimation module 129 estimates machine shaft torque based on the estimated power, measured speed and operating point efficiency information. The operating point efficiency information is stored in a lookup table, which is obtained during a motor characterization stage.

During motor characterization, multiple current commands are used at different speed points, which generates MTPA (maximum torque per amp) and MTPV (maximum torque per volt) curves. Many items are recorded such as phase current, phase voltage, torque, speed, etc. Efficiency data is generated by recording machine input power (terminal power) and also shaft power. By dividing shaft power by input power for each characterized operational point, an efficiency lookup table is generated. Then the inputs to the lookup table are the torque command percentage and voltage/speed ratio. The output will be an efficiency value.

Generally, motor characterization is a procedure used to determine d-axis and q-axis commands for a specific speed and torque command. The procedure is repeated at multiple torque commands and multiple speeds. Any know motor characterization procedure may be used.

The torque estimation module 129 does not need to use machine parameters information.

The torque estimation module 129 includes the rotor position $\theta_v$ calculation module 310 which determines the rotor position $\theta_v$ for a Park transformation on the phase voltages $V_{AN}$, $V_{BN}$ and $V_{CN}$. The rotor position calculation module 310 determines the rotor position $\theta_v$ based on a rotor position used for a Park transformation on phase currents $\theta_p$ or an extrapolated rotor position used for an inverse Park transformation in SVPWM $\theta_e$.

The rotor position $\theta_p$ is the actual rotor position value (from a resolver) at the same instant the phase currents are sampled. $\theta_e$ is calculated by the processor from $\theta_p$, deadtime, PWM period, and speed.

Figure 9A:
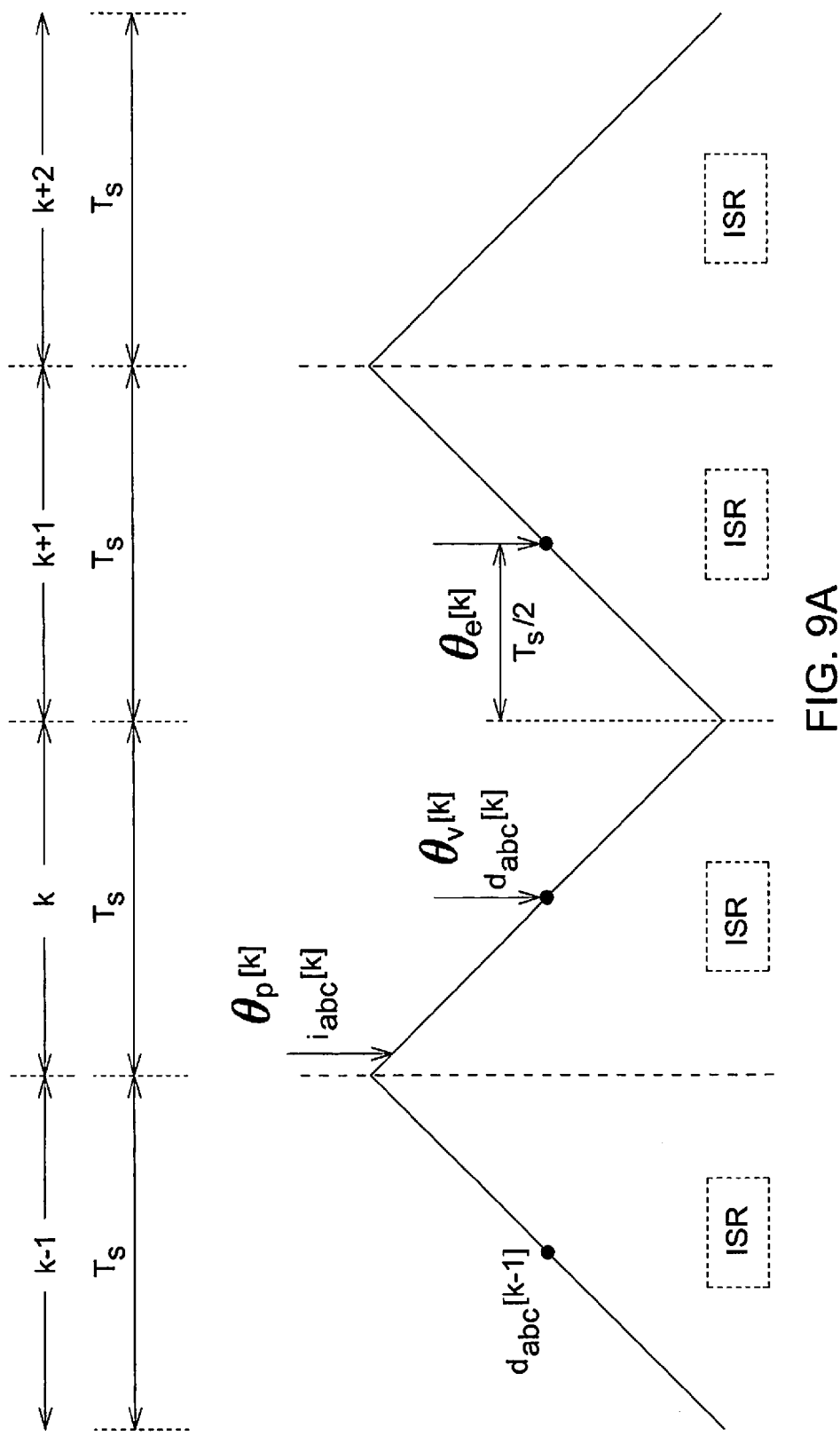
FIG. 9A illustrates an example embodiment of determining a rotor position using double control DSP based terminal voltage estimation.
Figure 9B:
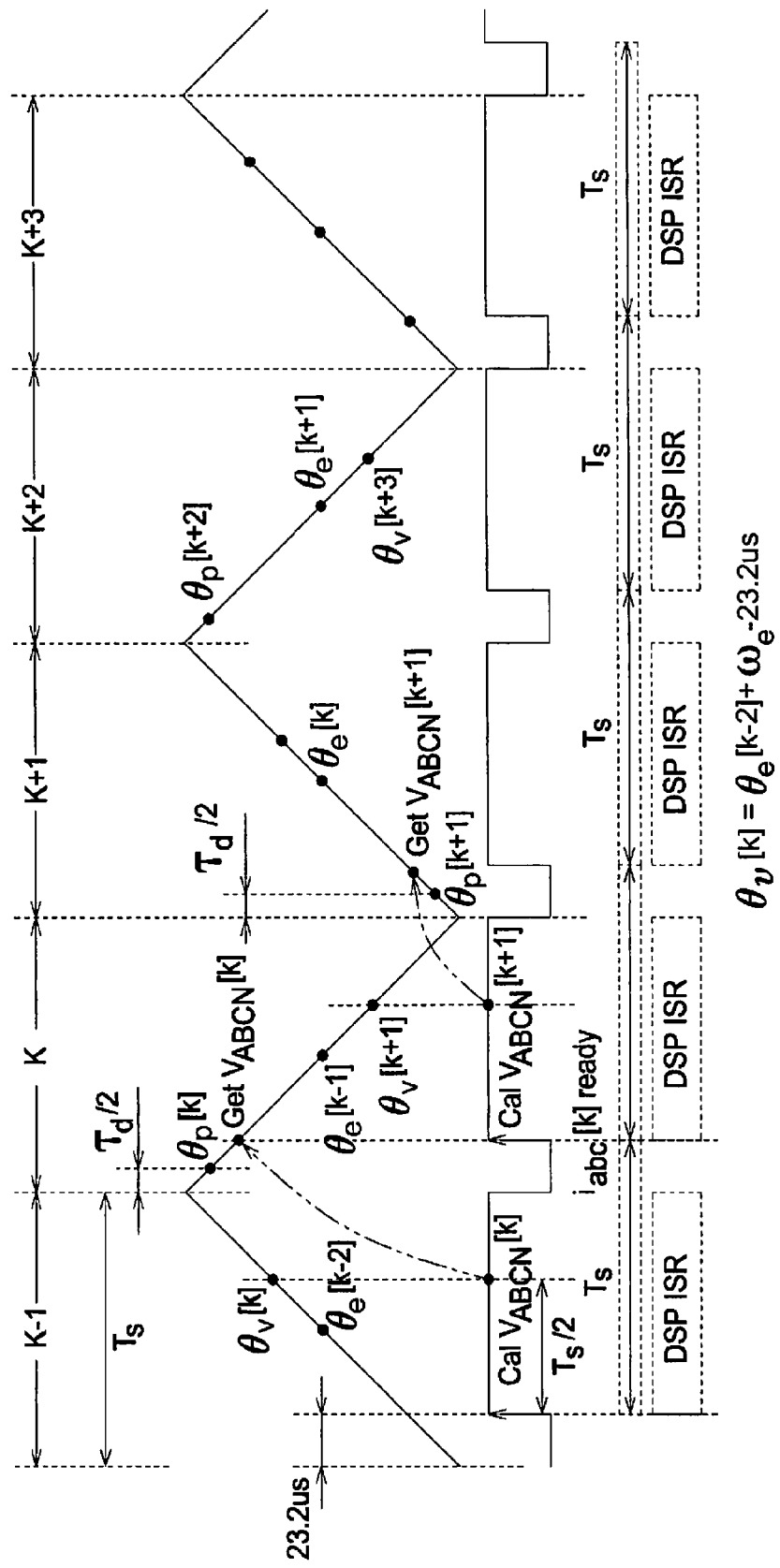
FIG. 9B illustrates an example embodiment of determining a rotor position using double control FPGA based terminal voltage estimation.
Figure 9C:
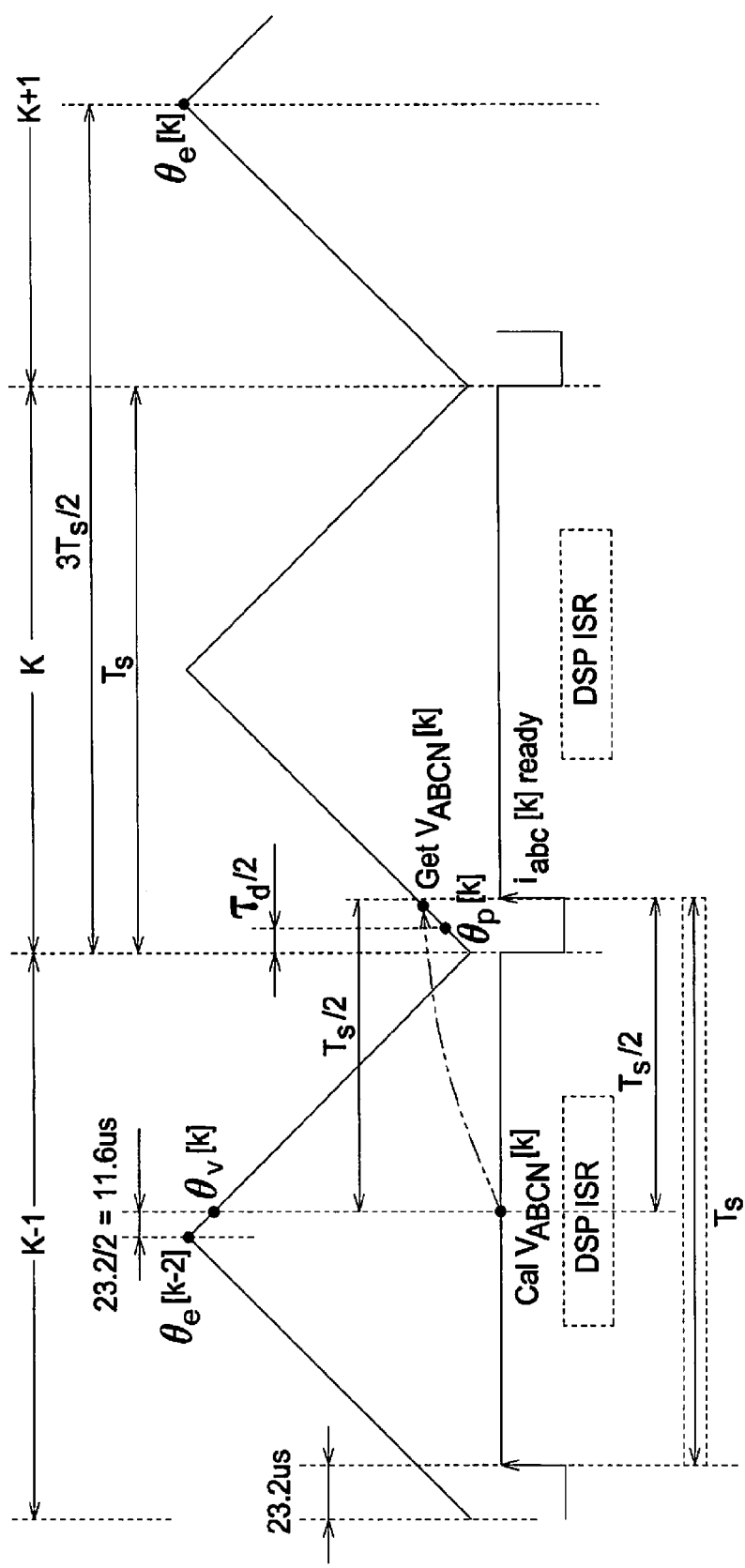
FIG. 9C illustrates an example embodiment of determining a rotor position using single control FPGA based terminal voltage estimation.

FIGS. 9A-9C illustrate different examples of calculating the rotor position $\theta_v$.

FIG. 9A illustrates an example embodiment of determining the rotor position $\theta_v$ using double control DSP based terminal voltage estimation.

FIG. 9A illustrates four control cycles, which are equivalent to two PWM switching cycles using double control. Using the $k^{th}$ control cycle as an example, the system processor 120 executes numerous tasks.

When the phase current information at the $k^{th}$ cycle, i.e., $i_{abc}[k]$ is ready, the system processor 120 will get this current information. With the rotor position at this time instant after compensation, i.e., the rotor position $\theta_p[k]$, Park transformation on the phase currents is performed to get the actual current $i_{dq}[k]$.

The current regulation controller 111 generates voltage reference $V^*_{dq}[k]$ based on the actual current information $i_{dq}[k]$ and current command $i^*_{dq}[k]$.

The PWM module 112 generates three phase duty ratios $d_{abc}[k]$ based on $v^*_{dq}[k]$ and $\theta_e[k]$. Although $d_{abc}[k]$ is generated at $k^{th}$ cycle, it only gets effective in the $k+1^{th}$ cycle. And in $k^{th}$ cycle, the actual effective duty ratios used for control are $d_{abc}[k-1]$. Due to the duty ratio shadowing mechanism, the extrapolated position i.e., $\theta_e[k]$, is used in SVPWM at step k.

For double control, the relationship between $\theta_e[k]$ and $\theta_p[k]$ in the PWM_Theta_Extropolation_Down Mode, can be expressed as:

$$\theta_e[k] = \theta_P[k] + \omega\left(T_s[k-2] + \frac{1}{2}T_s[k] - \frac{\tau_d}{2}\right) \quad (19)$$

where $T_s$ stands for the period of control iteration (denote period of PWM switching cycle as $T_{s,sw}$, for single control $T_s=T_{s,sw}$, while for double control $T_s=T_{s,sw}/2$).

As should be understood Up Mode and Down Mode refer to the positive and negative slopes, respectively, of the PWM waveform.

For the PWM_Theta_Extropolation_Up Mode, the equation for position extrapolation is different, and can be expressed as:

$$\theta_e[k] = \theta_P[k] + \omega\left(1.5 \cdot T_S[k-1] - \frac{\tau_d}{2}\right) \quad (20)$$

The machine terminal voltage estimation scheme, as described above, is performed by the system processor 120 at this step k, which uses information such as duty ratio information $d_{abc}[k-1]$, phase current information $i_{abc}[k]$ and DC bus voltage $V_{dc}[k]$. The estimated terminal phase voltage is $V_{abcN}[k]$.

Referring to FIG. 9A, the time instant of the rotor position $\theta_v[k]$ is synchronized with the averaging time instant of $V_{abcN}[k]$. Therefore, the system processor 120 calculates the rotor position $\theta_v[k]$ as:

$$\theta_v[k] = \theta_P[k] + \omega\left(\frac{1}{2}T_S[k-1] - \frac{\tau_d}{2}\right) \quad (21)$$

or determined by:

$$\theta_v[k] = \theta_e[k-1] \quad (22)$$

As should be understood, k stands for index of the control iteration (cycle). The k index after variable indicates the corresponding variable is used at that control iteration. For example, the rotor position $\theta_p[k]$ means the rotor position $\theta_p$ is used in the $k^{th}$ control iteration. Another example, the rotor position $\theta_e[k]$ means the rotor position $\theta_e$ is used in the $k^{th}$ control iteration. Although the rotor position $\theta_e[k]$ is extrapolated position and it locates in the next control cycle, i.e., $k+1^{th}$, it is calculated and used the $k^{th}$ control iteration.

FIG. 9B illustrates an example embodiment of determining the rotor position $\theta_v$ using double control FPGA based terminal voltage estimation. The time instant of the rotor position $\theta_v[k]$ is still synchronized with the averaging time instant of $V_{ABCN}[k]$.

Considering the time period used for terminal voltage estimation by FPGA method, the system processor 120 calculates the rotor position $\theta_v[k]$ as:

$$\theta_v[k] = \theta_P[k] - \omega\left(\frac{1}{2}T_S[k-2] + \frac{\tau_d}{2} - 23.2 \text{ us}\right) \quad (23)$$

or:

$$\theta_v[k] = \theta_e[k-2] + \omega \cdot 23.2 \text{ us} \quad (24)$$

The 23.2 us is the sum of the hardware delay and the FPGA filter delay. The filter delay is determined by the order of the filters. Therefore, the value for the sum of the delays could be varying due to different filter structure and orders.

The bottom waveform illustrates when the DSP interrupt service routine (ISR) fires, and the maximum amount of time the DSP has to execute the entire motor control algorithm.

FIG. 9C illustrates an example embodiment of determining the rotor position $\theta_v$ using single control FPGA based terminal voltage estimation.

In the $k^{th}$ control cycle, the current command $i^*_{dq}[k]$ is available, which is the same as the previous case. The system processor 120 calculates the present phase voltages $V_{ABCN}[k]$ in the $k-1^{th}$ cycle, and uses them the $k^{th}$ control cycle. The rotor position used for voltage Park Transformation at the $k^{th}$ cycle is as the rotor position $\theta_v[k]$, which is located in the mid-point of one $T_s$. The relationship between the rotor positions $\theta_v[k]$ and $\theta_p[k]$ can be expressed as:

$$\theta_v[k] = \theta_P[k] - \omega\left(\frac{1}{2}T_S[k-2] + \frac{\tau_d}{2} - \frac{23.2 \text{ us}}{2}\right) \quad (25)$$

or:

$$\theta_v[k] = \theta_e[k-2] + \omega\frac{23.2 \text{ us}}{2} \quad (26)$$

Referring back to FIG. 3, the Park transformation module 315 obtains the rotor position $\theta_v$ from the rotor position calculation module 310. The Park transformation module 315 performs a Park transformation on the present phase voltages $V_{ABCN}$ to generate rotating reference frame dq-axis voltages $V_{dq}$.

As should be understood, reference frame refers to a coordinate system used to represent and measure properties such as position (e.g., angular rotational position), velocity, torque, electrical parameters, and orientation of the rotor of the motor, the stator of the motor, or both. In a rotating reference frame, the instantaneous stator currents of a multi-phase motor can be expressed as a single complex stator current vector in a Cartesian coordinate system. If a Park transform or a similar transform is applied to the complex stator current vector, the reference frame has direct axis (d-axis) and quadrature axis (q-axis) components that rotate with rotor flux position (e.g., local maximum in magnetic field). For a motor with permanent magnets attached to the rotor the rotor flux position does not change with respect to the rotor, as opposed to where electromagnets are used in certain rotors.

The system processor 120 obtains voltage components $V_{\alpha\beta}$ in a two-phase stationary reference frame. In a stationary reference frame, the position (e.g., angular rotational position), rotational velocity, torque, electrical parameters and orientation of the rotor, the stator, or both are observed from a stationary observer's point of view. A stationary reference frame may refer to the case where the reference frame is aligned with the stator of the motor, or where the d-axis and the q-axis do not rotate with the rotor. For the rotor or stator, a stationary reference frame is mutually exclusive to a rotating reference frame.

The voltage components $V_{\alpha\beta}$ are equivalent to the voltage components $V_{s\_real}$ and $V_{s\_imaginary}$, respectively, which are determined in the machine power estimation described above, as:

$$V_{s\_real} = \frac{2}{3} \cdot \left(V_{AN} + V_{BN} \cdot \cos\left(\frac{2\pi}{3}\right) + V_{CN} \cdot \cos\left(\frac{4\pi}{3}\right)\right) = V_\alpha \quad (27)$$

$$V_{s\_imag} = \frac{2}{3} \cdot \left(V_{BN} \cdot \sin\left(\frac{2\pi}{3}\right) + V_{CN} \cdot \sin\left(\frac{4\pi}{3}\right)\right) = V_\beta \quad (28)$$

The system processor 120 performs the Park transformation as:

$$\begin{cases} V_d = +V_\alpha\cos(\theta_v) + V_\beta\sin(\theta_v) \\ V_q = -V_\alpha\sin(\theta_v) + V_\beta\cos(\theta_v) \end{cases} \quad (29)$$

To further reduce the oscillation in the calculated Vdq, a moving-average may be implemented. The window length for moving average may vary according to the execution rates of the Park transform on voltage and moving average functions. For example, a 10 ms window length may be used. If the PWM frequency is 6000 Hz, 60 steps moving average is equivalent to 60/6=10 ms.

The terminal power estimation module 320 obtains the rotating reference frame dq-axis voltages $V_{dq}$ from the Park transformation module 315. The terminal power estimation module 320 generates an estimated terminal power $P_{est}$ based on the voltages $V_{dq}$ and the final current commands $i_d^*$, $i_q^*$, which may be the current commands iq_cmd, id_cmd or adjusted values thereof if the estimated terminal voltage is above the terminal voltage threshold.

The terminal power estimation module 320 is based on the basic relationship among machine terminal power, shaft torque, voltage and current. From mechanical standpoint, the terminal input power can be expressed as:

$$P_{est} = T_{shaft} \omega_{shaft} + \Delta P_{losses} \quad (30)$$

where $\Delta P_{losses}$ is the total power losses, which includes copper loss, core loss, friction & windage, etc., and $\omega_{shaft}$ is the shaft speed, $T_{shaft}$ is the shaft torque. From electrical standpoint, the terminal input power can be expressed as:

$$P_{est} = 3/2(v_d i_d + v_q i_q) \quad (31)$$

Since the actual dq-axis current information may have large oscillations around respective reference values, the final dq-axis current commands $i_d^*$, $i_q^*$ are used to be used in power estimation. Therefore, the system processor 120 calculates the estimated terminal power $P_{est}$ as:

$$P_{est} = 3/2(v_d i_d^* + v_q i_q^*) \quad (32)$$

The shaft torque estimation module 330 obtains the estimated terminal power $P_{est}$ from the terminal power estimation module 320. The shaft torque estimation module 330 generates an estimated torque based on the estimated terminal power $P_{est}$, an interpolated efficiency $\eta$ and shaft speed $\omega_{shaft}$. The shaft speed $\omega_{shaft}$ may be obtained using any known method.

In an IPM characterization procedure, machine efficiency data corresponding to each torque command percentage and voltage-speed ratio combination are available. Similar to the dq-axis current lookup table, an efficiency lookup table is also created from characterization, which also uses ratio and torque command percentage as inputs. Considering the efficiency table and current lookup tables have the same inputs, efficiency lookup table is connected in parallel with the id and iq lookup tables (e.g., 109) to share the same inputs. In the case of separate motoring and braking characterization, there will be two different efficiency lookup tables for motoring and braking modes.

The efficiency extraction module 325 includes efficiency lookup tables (stored in the data storage device 260) for motoring and braking modes, respectively. Based on the torque command percentage, ratio and mode, the efficiency extraction module 325 utilizes the lookup table associated with the mode and produces the interpolated efficiency $\eta$.

For motoring mode, $$\eta \cdot P_{terminal} = T_{shaft} \cdot \omega_{shaft} \text{ and } \eta_{shaft} = T_{shaft} \cdot \omega_{shaft}/P_{terminal} \quad (33)$$

While for braking mode, $$P_{terminal} = \eta \cdot T_{shaft} \cdot \omega_{shaft} \text{ and } \eta = P_{terminal}/T_{shaft} \cdot \omega_{shaft} \quad (34)$$

The shaft torque estimation module estimates the torque $T_{est}$ as follows:

Since the operating point efficiency data has been collected during the IPM characterization stage, the interpolated efficiency $\eta$ under any speed and loading condition can be utilized by the shaft torque estimation module 330 to handle the power losses as:

$$T_{shaft\_est\_init} = \eta \frac{3(v_d i_{d\_cmd} + v_q i_{q\_cmd})}{2\omega_{shaft}} \quad (35)$$

To further filter out noise in the estimated torque, a second order low-pass filter may be used by the shaft torque estimation module 330. And the final expression for estimated torque by the shaft torque estimation module 330 is:

$$T_{shaft\_est} = \eta \frac{3(v_d i_d^* + v_q i_q^*)}{2\omega_{shaft}} \frac{A}{S^2 + \sqrt{2} s + 1} \quad (36)$$

where A is the DC gain of the second order low pass filter.

The torque compensation module 131 uses an error between estimated shaft torque and raw torque command to adjust raw torque command. The torque compensation module 131 reduces the error between estimated torque and raw torque command. Since only the torque command has been modified, the current command trajectory is still determined by the dq-axis current lookup table, which forces the current commands close to the optimal efficiency.

The torque compensation module 131 is configured to generate the final torque command data $T_{cmd\_final}$ based on the estimated torque data $T_{est}$ from the shaft torque estimation module 330. The torque compensation module 131 may be slewing based or PI based.

Figure 10:
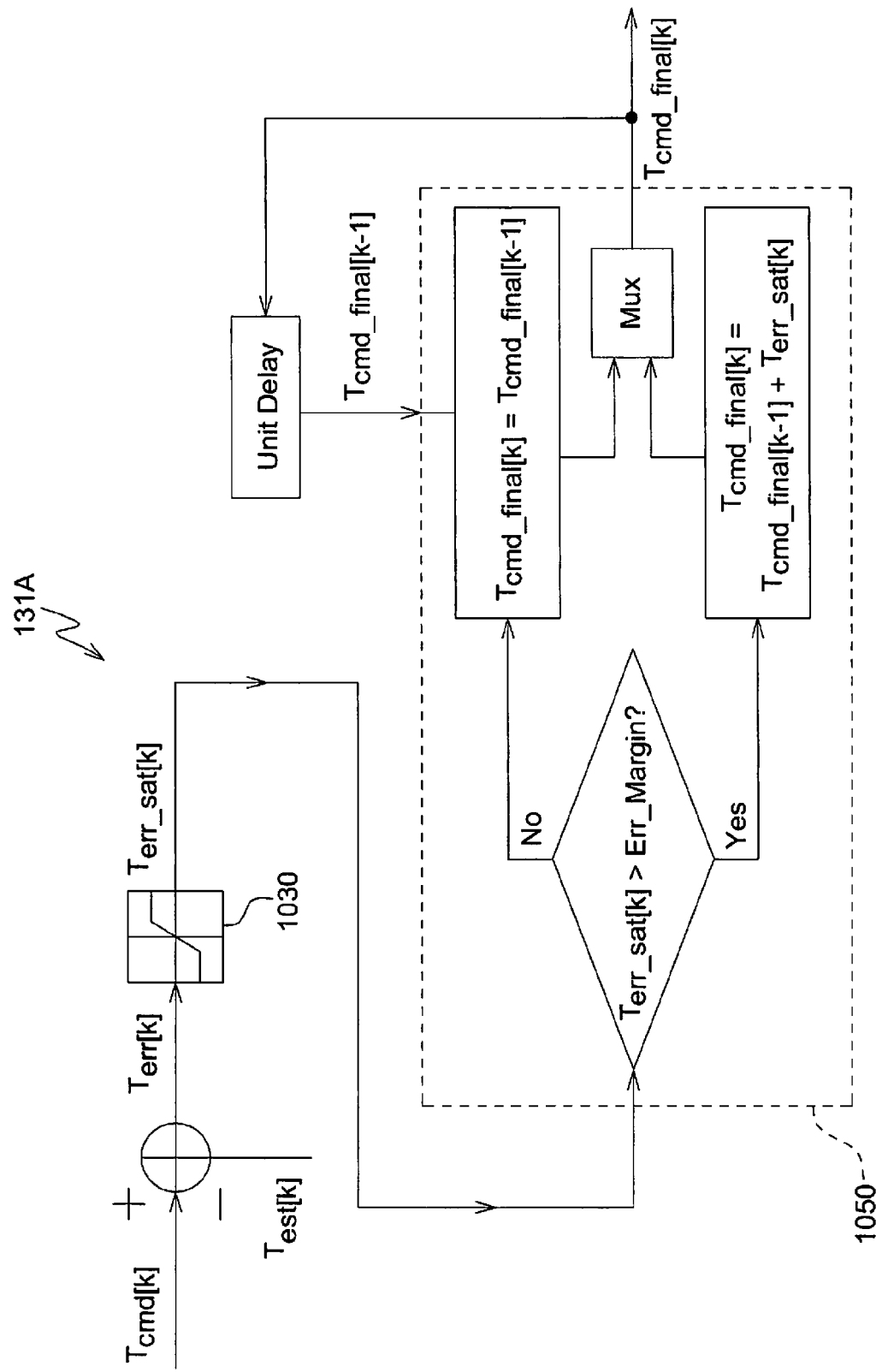

FIG. 10 illustrates a slewing based torque compensation scheme according to an example embodiment.

As shown in FIG. 10, a torque compensation module 131A determines a difference between the estimated torque data $T_{est}$ and the torque command $T_{cmd}$, which is identified as $T_{err}$. The torque compensation module 131A passes the difference through a limiter 1030. The limits of the limiter 1030 are determined on a system level basis and based on empirical data. They are determined by the processor based on the machine which the inverter circuit 188 is electrically connected to. For example, if a machine has a very large rated torque the error limiter will be larger than if a machine has a much smaller rated torque.

The limiter 1030 outputs a saturated difference $T_{err\_sat}$ to a determination unit 1050. The torque compensation module 131A then determines whether the saturated difference $T_{err\_sat}$ is greater than an error margin. Similar to the limits of the limiter, the error margin is determined on a system level basis and based on empirical data. If the saturated difference $T_{err\_sat}$ is less than or equal to an error margin, the determination unit 1050 determines that the final torque command $T_{cmd\_final}$ for a kth cycle is the final torque command for the previous k–1th cycle. If the saturated difference $T_{err\_sat}$ is greater than an error margin, the determination unit 1050 determines that the final torque command $T_{cmd\_adj}$ for a kth cycle is the final torque command for the previous k–1th cycle plus the saturated difference $T_{err\_sat}$.

Figure 11:
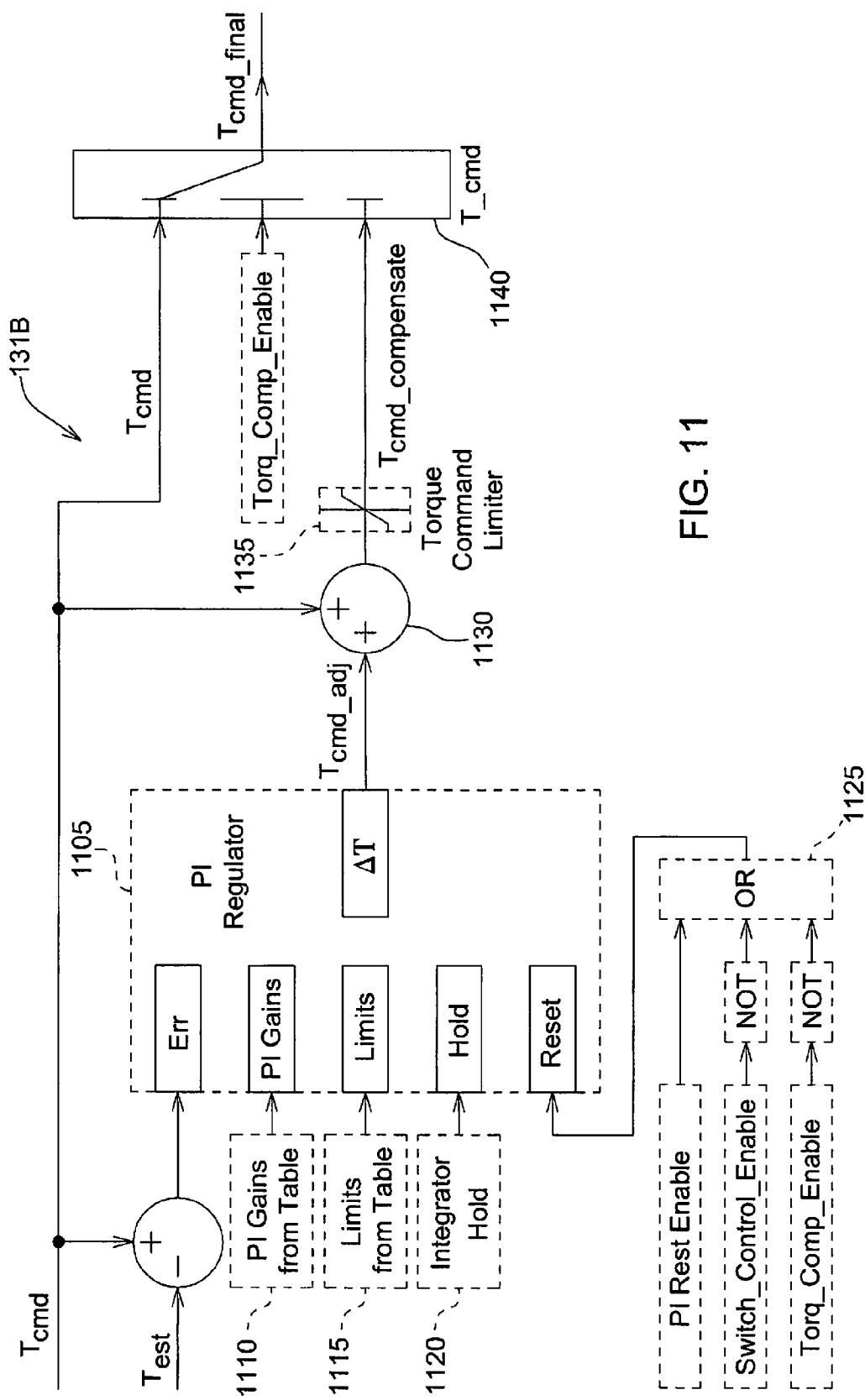

FIG. 11 illustrates a PI based torque compensation scheme according to an example embodiment. A torque compensation module 131B includes a PI regulator 1105.

The PI regulator 1105 generates an adjustment to the raw torque command $T_{cmd}$. This adjustment is added to the raw torque command $T_{cmd}$ to form a compensated torque command $T_{cmd\_compensate}$.

The PI regulator 1105 obtains an error between the raw torque command $T_{cmd}$ and the estimated torque $T_{est}$. The PI regulator 1105 obtains PI gains from a table 1110. The PI gains are tuned online. The PI gains are tuned in laboratory testing. The gains are set by determining values for rise time, steady state error, and other PI controller system design characteristics. Once the gains are obtained they are stored in the data storage device 260.

The PI regulator 1105 also obtains limits from a table 1115 and an integrator hold signal from an integrator generator 1120. The limits from the table 1115 include both integrator and PI sum limits. The limits are set to be a percentage of the raw torque command. For example, the limits can be 10% of the raw torque command, so for a 100 Nm raw torque command the integrator and sum limits are 10 Nm. This will give a maximum adjusted torque command of 10 Nm and a maximum final torque command of 110 Nm.

The PI regulator 1105 is also configured to obtain a reset signal. The reset signal may be generated by an OR gate whenever a PI rest enable signal, a switch control disable signal or torque compensation disable signal is received. Upon a reset the integrator value is reset.

The PI regulator 1105 outputs a torque command adjustment term, $\Delta T$, based on the error, PI gains and limits.

An adder 1130 adds the raw torque command $T_{cmd}$ and the torque command adjustment $T_{cmd\_adj}$. The output of the adder 1130 is input to a torque command limiter 1135 which produces the adjusted compensated torque command $T_{cmd\_compensate}$. The torque command limiter 1135 prevents the sum of raw torque command $T_{cmd}$ and the torque command adjustment $T_{cmd\_adj}$ from exceeding a torque limit.

Figure 12:
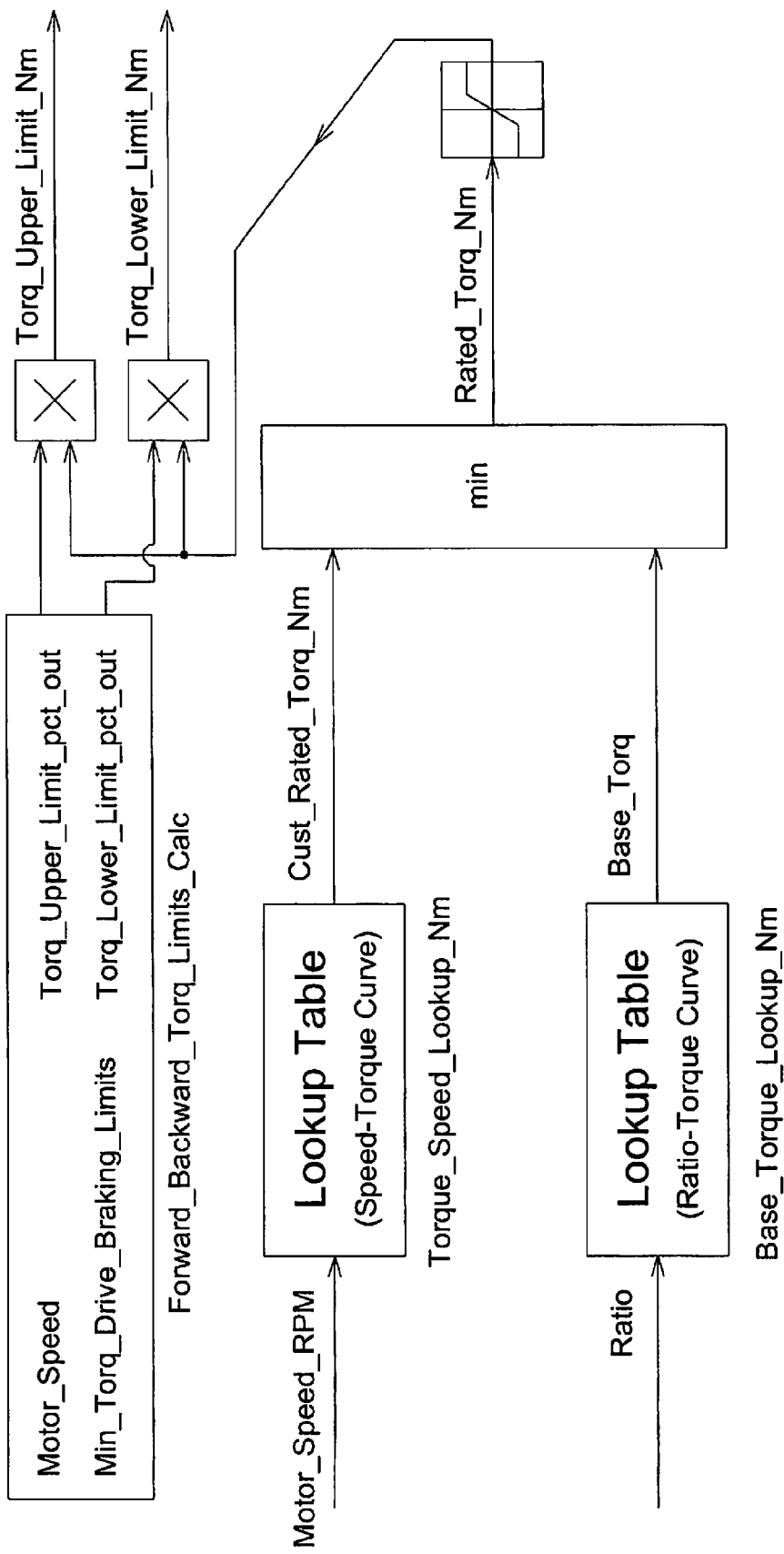

FIG. 12 illustrates a method of generating the torque upper/lower limits for the torque command limiter 1135, according to an example embodiment.

Based on speed-torque curve, customer rated torque Cust_Rated_Torq_Nm is obtained. Based on a ratio-torque curve, the base torque Base_Torq is obtained. From the motor characterization data, base torque values are respectively associated with discrete speed points with a nominal dc bus voltage level. During the IPM motor characterization procedure, each characterized rotor shaft speed has a maximum output torque which is defined as the base torque at that speed. Thus, the base torque may also be referred to a peak torque.

The minima of customer rated torque and base torque is used as a rated torque Rated_Torq_Nm. And then the torque upper and lower limits are determined by the products of rated torque and derating torque percentage (Torq_Upper/Lower_Limit_pct_out).

The upper and lower limits are then determined by the product of the rated torque Rated_Torq_Nm and the upper/lower derating torque percentage. These percentages range from 0% (fully derated) to 100% (no derate). There a several ways the upper/lower derating torque percentages are calculated. In an example embodiment, there can be a derating for high machine temperature, high inverter temperature, DC bus voltage, machine speed, hardware limits, etc. The derating which is the most severe (lowest percentage) is used as the final derating percentage value.

The rated torque is limited to a peak characterized torque and also hardware toque command limit.

Referring back to FIG. 11, a selector 1140 selects one of the raw torque command $T_{cmd}$ and the compensated torque command $T_{cmd\_compensate}$ as the final torque command $T_{cmd\_final}$.

The selector 1140 receives a Torq_Comp_Enable flag to determine which torque command, raw torque command $T_{cmd}$ or compensated torque command $T_{cmd\_compensate}$, should be used as the actual final torque command $T_{cmd\_final}$.

There are several examples to determine the value of Torq_Comp_Enable, i.e., whether to enable the torque compensator or not. For testing purposes, a manually changed global flag may be used. In another example embodiment the Torq_Comp_Enable flag may be based on speed. For example, the system processor may enable the torque compensator the speed exceeds 1000 RPM. This speed dependent enable feature can be implemented by using hysteresis or relay.

Figure 13:
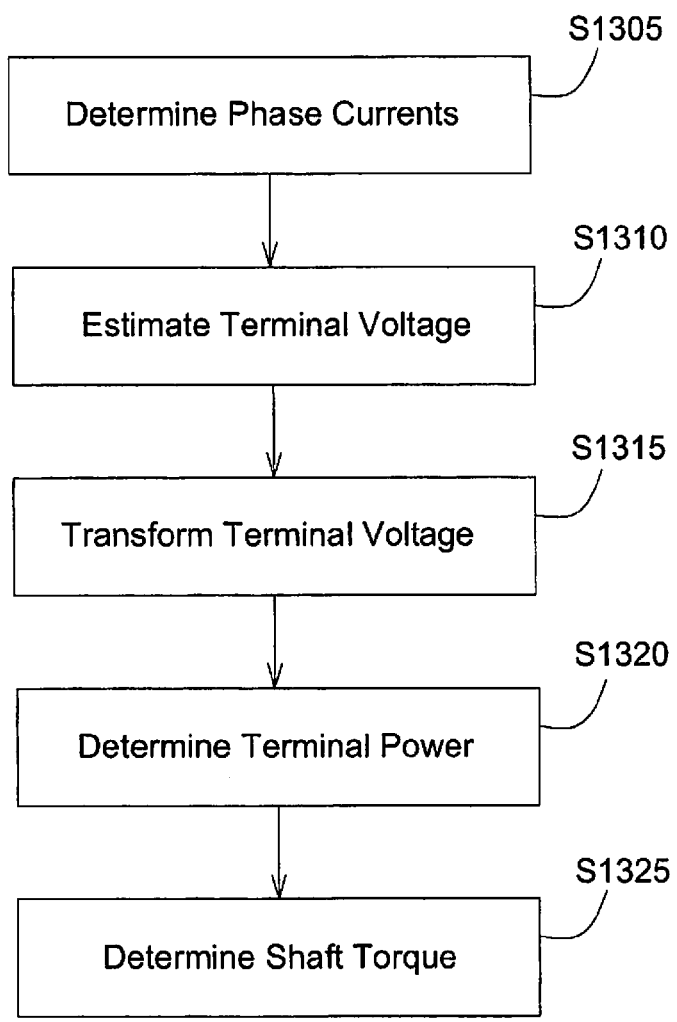

FIG. 13 illustrates a method of torque estimation and compensation according to an example embodiment. The method of FIG. 13 may be performed by the processor 120 and, more specifically, the machine terminal voltage estimation module 127, the torque estimation module 129 and the torque compensation module 131.

At S1305, the processor 120 determines phase currents (ia, ib and ic). At S1310, the processor 120 estimates the terminal voltage of the machine. For example, the terminal voltage may be estimated using the method shown in FIG. 7. The processor then transforms the estimated terminal voltage at S1315. For example, the Park transformation module 315 obtains the rotor position $\theta_r$ from the rotor position calculation module 310. The Park transformation module 315 performs a Park transformation on the real and imaginary portions of the estimated terminal voltage to generate rotating reference frame dq-axis voltages $V_{dq}$. The processor then determines a terminal power at S1320. For example, the terminal power estimation module 320 obtains the rotating reference frame dq-axis voltages $V_{dq}$ from the Park transformation module 315. The terminal power estimation module 320 generates an estimated terminal power $P_{est}$ based on the voltages $V_{dq}$ and the final current commands $i_d^*$, $i_q^*$, which may be the current commands iq_cmd, id_cmd or adjusted values thereof if the estimated terminal voltage is above the terminal voltage threshold.

At S1325, the processor determines an estimated shaft torque. The estimated shaft torque may be estimated the interpolated efficiency $\eta$ under any speed and loading condition can be utilized by the shaft torque estimation module 330 to handle the power losses as:

$$T_{shaft\_est\_init} = \eta \frac{3(v_d i_{d\_cmd} + v_q i_{q\_cmd})}{2\omega_{shaft}} \quad (37)$$

To further filter out noise in the estimated torque, a second order low-pass filter may be used by the shaft torque estimation module 330. And the final expression for estimated torque by the shaft torque estimation module 330 is:

$$T_{shaft\_est} = \eta \frac{3(v_d i_d^* + v_q i_q^*)}{2\omega_{shaft}} \frac{A}{S^2 + \sqrt{2}s + 1} \quad (38)$$

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A control device for controlling an alternating current (ac) machine, comprising:
    a processor configured to,
        select a modulation mode from a plurality of modulation modes, determine a plurality of present phase voltages corresponding to phases of an inverter based on the selected modulation mode, a direction of a carrier wave of the selected modulation mode and polarities of phase currents associated with the plurality of present phase voltages of the inverter when a first modulation mode is the selected modulation mode, the determination compensating for deadtimes associated with the selected modulation mode and phases of the inverter, the inverter configured to drive the ac machine, and determine an estimated terminal voltage based on the plurality of present phase voltages.

2. The control device of claim 1, wherein the processor is configured to, determine the plurality of present phase voltages of the inverter based on polarities of phase currents associated with the plurality of present phase voltages of the inverter and clamped switches in corresponding phases of the inverter when a second modulation mode is the selected modulation mode.

3. The control device of claim 1, wherein the processor is configured to, determine the plurality of present phase voltages of the inverter further based on duty ratios of the selected modulation mode associated with the phases, respectively.

4. The control device of claim 1, wherein the processor is configured to, determine the plurality of present phase voltages of the inverter based on clamped switches in corresponding phases of the inverter.

5. The control device of claim 1, wherein the processor is configured to, determine a first rotor position, the first rotor position being a rotor position of the ac machine for transformation of the phase currents associated with the plurality of present phase voltages of the inverter; and determine a second rotor position based on the first rotor position, the second rotor position being a rotor position of the ac machine for transformation of the plurality of present phase voltages of the inverter, the first rotor position and the second rotor position being different.

6. The control device of claim 5, wherein the processor is configured to determine the second rotor position such that the second rotor position occurs at a time synchronized with the determination of the plurality of present phase voltages of the inverter.

7. The control device of claim 5, wherein the processor is configured to, transform the plurality of present phase voltages of the inverter from three phases to two phases based on the second rotor position; and determine the estimated terminal voltage based on the transformed plurality of present phase voltages of the inverter, the estimated terminal voltage being two-phase rotating reference frame voltages.

8. The control device of claim 5, wherein the processor is configured to, transform the plurality of present phase voltages of the inverter into two-phase stationary reference frame voltages.

9. The control device of claim 8, wherein the processor is configured to, determine the estimated terminal voltage based on the two-phase stationary reference frame voltages, the estimated terminal voltage representing a magnitude of a three phase line to line voltage.

10. The control device of claim 1, wherein the control device is a digital signal processor (DSP).

11. The control device of claim 1, wherein the selected modulation mode is one of space vector pulse width modulation (SVPWM) and discontinuous pulse width modulation.

12. A method of determining an estimated terminal voltage of an inverter for an alternating current (ac) machine, the method comprising:

selecting a modulation mode from a plurality of modulation modes;

determining a plurality of present phase voltages corresponding to phases of an inverter based on the selected modulation mode, a direction of a carrier wave of the selected modulation mode and polarities of phase currents associated with the plurality of present phase voltages of the inverter when a first modulation mode is the selected modulation mode, the determination compensating for deadtimes associated with the selected modulation mode and phases of the inverter, the inverter configured to drive the ac machine; and determining an estimated terminal voltage based on the plurality of present phase voltages.

13. The method of claim 12, wherein the determining the plurality of present phase voltages determines the plurality of present phase voltages of the inverter based on polarities of phase currents associated with the plurality of present phase voltages of the inverter and clamped switches in corresponding phases of the inverter when a second modulation mode is the selected modulation mode.

14. The method of claim 12, wherein the determining the plurality of present phase voltages determines the plurality of present phase voltages of the inverter further based on duty ratios of the selected modulation mode associated with the phases, respectively.

15. The method of claim 12, wherein the determining the plurality of present phase voltages determines the plurality of present phase voltages of the inverter based on clamped switches in corresponding phases of the inverter.

16. The method of claim 12, wherein the determining the estimated terminal voltage includes, determining a first rotor position, the first rotor position being a rotor position of the ac machine for transformation of the phase currents associated with the plurality of present phase voltages of the inverter; and determining a second rotor position based on the first rotor position, the second rotor position being a rotor position of the ac machine for transformation of the plurality of present phase voltages of the inverter, the first rotor position and the second rotor position being different.

17. The method of claim 16, wherein the determining the second rotor position determines the second rotor position such that the second rotor position occurs at a time synchronized with the determination of the plurality of present phase voltages of the inverter.

18. The method of claim 16, wherein the determining the estimated terminal voltage includes, transforming the plurality of present phase voltages of the inverter from three phases to two phases based on the second rotor position; and determining the estimated terminal voltage based on the transformed plurality of present phase voltages of the inverter, the estimated terminal voltage being two-phase rotating reference frame voltages.

19. The method of claim 16, wherein the determining the estimated terminal voltage includes,
transforming the plurality of present phase voltages of the inverter into two-phase stationary reference frame voltages.

20. The method of claim 19, wherein the determining the estimated terminal voltage determines the estimated terminal voltage based on the two-phase stationary reference frame voltages, the estimated terminal voltage representing a magnitude of a three phase line to line voltage.

21. The method of claim 12, wherein the selected modulation mode is one of space vector pulse width modulation (SVPWM) and discontinuous pulse width modulation.

* * * * *